United States Patent [19]
Yoshida et al.

[11] Patent Number: 5,724,112
[45] Date of Patent: Mar. 3, 1998

[54] COLOR LIQUID CRYSTAL APPARATUS

[75] Inventors: Tetsushi Yoshida, Sagamikomachi; Zenta Kikuchi; Hisashi Aoki, both of Hamura, all of Japan

[73] Assignee: Casio Computer Co., Ltd., Tokyo, Japan

[21] Appl. No.: 491,088

[22] Filed: Jun. 16, 1995

Related U.S. Application Data

[63] Continuation of Ser. No. 411,328, Mar. 27, 1995, abandoned.

[30] Foreign Application Priority Data

| Mar. 28, 1994 | [JP] | Japan | 6-56518 |
| Mar. 28, 1994 | [JP] | Japan | 6-56523 |
| Mar. 29, 1994 | [JP] | Japan | 6-58560 |
| Mar. 29, 1994 | [JP] | Japan | 6-58561 |

[51] Int. Cl.$^6$ ............. G02F 1/1335; G02F 1/1333
[52] U.S. Cl. ............. 349/117; 349/99; 349/114; 349/121
[58] Field of Search ............. 359/63, 73, 93, 359/71, 59, 68; 349/99, 117, 119, 42, 113, 114, 121

[56] References Cited

U.S. PATENT DOCUMENTS

| 4,097,128 | 6/1978 | Matsumoto et al. | 359/63 |
| 4,232,948 | 11/1980 | Shanks | 359/73 |
| 4,466,702 | 8/1984 | Wiener-Avnear et al. | 359/63 |
| 4,470,666 | 9/1984 | Eick | 359/50 |
| 4,984,874 | 1/1991 | Yamamoto et al. | 359/63 |
| 5,061,042 | 10/1991 | Nakamura et al. | 359/73 |
| 5,124,824 | 6/1992 | Kozaki et al. | 359/93 |
| 5,150,237 | 9/1992 | Iimura et al. | 359/73 |
| 5,175,638 | 12/1992 | Kanemoto et al. | 359/73 |
| 5,184,236 | 2/1993 | Miyashita et al. | 359/93 |
| 5,191,454 | 3/1993 | Iijima et al. | 359/63 |
| 5,212,819 | 5/1993 | Wada | 359/63 |
| 5,359,441 | 10/1994 | Mori et al. | 359/59 |
| 5,387,463 | 2/1995 | Nakamura et al. | 428/327 |
| 5,446,562 | 8/1995 | Sato et al. | 359/59 |
| 5,499,126 | 3/1996 | Abileah et al. | 359/68 |
| 5,570,211 | 10/1996 | Hanaoka et al. | 359/53 |

FOREIGN PATENT DOCUMENTS

| 3-116015 | 5/1991 | Japan | 359/73 |
| 6-235930 | 8/1994 | Japan | |

*Primary Examiner*—William L. Sikes
*Assistant Examiner*—Toan Ton
*Attorney, Agent, or Firm*—Frishauf, Holtz, Goodman, Langer & Chick

[57] ABSTRACT

A color liquid crystal display device including a transparent first substrate having an inner surface and at least one transparent electrode formed thereon, and an insulating second substrate having an inner surface arranged to oppose the inner surface of the first substrate and at least one electrode formed on the inner surface of the second substrate. A liquid crystal layer is sandwiched between the inner surfaces of the first and second substrates and has a predetermined initial aligned state. A polarizing member is arranged on a first substrate side of the liquid crystal layer, and at least one retardation plate is provided for coloring light which emerges from the liquid crystal display. The retardation plate is arranged between the liquid crystal layer and the polarizing member such that an optical axis of the retardation plate with respect to a transmission axis of the polarizing member is not parallel to or perpendicular to the transmission axis. A reflecting member is arranged on a liquid crystal layer side of the second substrate.

23 Claims, 20 Drawing Sheets

COLOR LIQUID CRYSTAL APPARATUS

This is a continuation of application Ser. No. 08/411,328 filed Mar. 27, 1995, now abandoned.

BACKGROUND OF THE INVENTION

1. Field of the Invention

The present invention relates to a color liquid crystal display device having a reflection display function in which externally incident light such as natural light or indoor illumination light is reflected to perform a display operation.

2. Description of the Related Art

In recent years, a TN (Twisted Nematic) active matrix liquid crystal display device has been popularly used.

This TN active matrix liquid crystal display device is constituted by an active matrix liquid crystal cell in which liquid crystal molecules are twisted and aligned at a twist angle of about 90°, and a pair of polarizing plates arranged via the liquid crystal cell. The pair of polarizing plates are arranged such that their transmission axes are almost parallel or perpendicular to a liquid crystal aligning direction on one of the substrates of the liquid crystal cell.

In the active matrix liquid crystal cell, a plurality of transparent pixel electrodes and a plurality of active elements (e.g., thin film transistors) respectively corresponding to the pixel electrodes are arranged in a matrix on the inner surface of one of the pair of transparent substrates arranged via the liquid crystal layer, and a transparent counter electrode opposing the pixel electrodes is arranged on the inner surface of the other substrate. The aligning direction of the liquid crystal molecules is restricted by aligning films respectively arranged on the surfaces of the substrates on which the electrodes are formed, and the liquid crystal molecules are twisted and aligned at a twist angle of about 90°. Note that a nematic liquid crystal having a positive dielectric anisotropy is used as the above liquid crystal.

In the liquid crystal display device using a TN mode negative display scheme, externally incident light is directly polarized by one polarizing plate, and transmission of light passing through the liquid crystal cell is controlled by the other polarizing plate, thereby performing a display. In a state wherein no ON voltage is applied across the electrodes of both the substrates of the liquid crystal cell, i.e., a state wherein the liquid crystal molecules are twisted and aligned, linearly polarized light incident on the liquid crystal cell emerges from the liquid crystal cell as linearly polarized light whose polarizing direction is shifted by about 90°, and the linearly polarized light is absorbed by the other polarizing plate, thereby setting the display in a dark state.

When an ON voltage is applied across the electrodes of the liquid crystal cell, the liquid crystal molecules are raised/aligned perpendicularly to the substrate surfaces, and the linearly polarized light incident on the liquid crystal cell directly emerges from the liquid crystal cell. This linearly polarized light transmits through the other polarizing plate, thereby setting the display in a bright state.

Note that there are transparent liquid crystal display devices and reflection liquid crystal display devices in which a reflecting plate is arranged on the rear surface. In the reflection liquid crystal display device, light incident on the front surface side sequentially passes through a front polarizing plate, a liquid crystal cell, and a rear polarizing plate and then is reflected by the reflecting plate. The reflected light sequentially passes through the rear polarizing plate, the liquid crystal cell and then the front polarizing plate and emerges from the liquid crystal display device.

As the TN active matrix liquid crystal display device, a liquid crystal display device for displaying a multi-color image is known. In this color liquid crystal display device for displaying the color image, a tricolor filter of a plurality of colors such as red, green, and blue is arranged on one substrate of the liquid crystal cell in correspondence with the pixel electrodes.

In the conventional liquid crystal display device, the color filter is used to color light, so that the luminance of colored light is low, and a dark display is disadvantageously caused.

These problems are posed by the light absorption of the color filter. A color filter absorbs light except for light in a wavelength band corresponding to the color of the color filter to color the light. However, the color filter absorbs the light in the wavelength band at a relatively high absorption, the colored light passing through the color filter has a light amount considerably smaller in the wavelength band than that of the light which is not incident on the color filter, and a dark display is caused.

In addition, when the conventional liquid crystal display device is used as a reflection color liquid crystal display device, light incident on the front surface side passes through the front polarizing plate, the liquid crystal cell, and the rear polarizing plate and is reflected by the reflecting plate. The reflected light passes through the rear polarizing plate, the liquid crystal cell, and the front polarizing plate again and emerges from the liquid crystal display device. For this reason, in these processes, the transmitted light passes through each of both the substrates of the liquid crystal cell and each of the front and rear polarizing plates twice. Therefore, a light amount loss owing to the light absorption of the substrates and the polarizing plates is large, and the display becomes dark.

In the conventional liquid crystal display device, since the display colors are determined by the colors of color filters, a plurality of colors cannot be displayed by one pixel. A desired color is generally displayed using three pixels. For this reason, a color liquid crystal display cannot easily perform a high-definition display operation.

SUMMARY OF THE INVENTION

It is an object of the present invention to provide a color liquid crystal display device having a reflection display function in which light is colored without using a color filter to obtain colored light having a high luminance, a light amount loss owing to the light absorption of the substrates of a liquid crystal cell and polarizing plates is small, a bright display can be obtained, and a plurality of colors can be displayed by one pixel.

The present invention has been made to achieve the above object. According to one aspect of the present invention, a color liquid crystal display device has a transparent first substrate having a transparent electrode formed on a front surface of the transparent first substrate, a second substrate arranged to oppose the first substrate and having an electrode formed on an inner surface opposing the transparent electrode, a liquid crystal layer sandwiched between the first and second substrates and having a predetermined initial aligned state, a polarizing member arranged on a first substrate side of the liquid crystal layer such that a transmission axis of the polarizing member is shifted by a predetermined angle with respect to a liquid crystal molecule aligning direction on the first substrate side of the liquid crystal layer not to be parallel or perpendicular to the liquid crystal molecule aligning direction, and a reflecting member arranged on a liquid crystal layer side of the second substrate.

In the color liquid crystal display device, birefringence occurring in the liquid crystal layer is controlled and changed by the magnitude of a voltage applied to the liquid crystal. That is, while linearly polarized light incident through the polarizing member passes through the liquid crystal layer of the liquid crystal cell, the polarized state of the linearly polarized light is changed by the birefringence effect of the liquid crystal layer, and this light is reflected by the reflecting member arranged on the liquid crystal layer side of the second substrate. While the reflected light passes through the liquid crystal layer, the polarized state of the reflected light is changed into the polarized state, different from the polarized state of the linearly polarized light, and this light is incident on the polarizing member. Light having a polarized light component transmitted through the polarizing member emerges as colored light.

More specifically, in this liquid crystal display device, light is colored using the birefringence effect of the liquid crystal layer of the liquid crystal cell without using a color filter. Since the liquid crystal layer only changes the polarized state of the transmitted light and slightly absorbs the light, the light amount of colored light having a polarized state changed by the birefringence effect, transmitted through the polarizing member, and emerging from the polarizing member is almost equal to the light amount of light in the wavelength band of the colored light of the linearly polarized light incident through the polarizing member. For this reason, colored light having a high luminance can be obtained.

In addition, although the liquid crystal display device is of a transmission type, light incident on the front surface side of the liquid crystal display device, reflected by the reflecting film, and emerging from the front surface side of the liquid crystal display device, in these processes, passes through the first substrate of the liquid crystal cell, the liquid crystal layer, and one polarizing member only twice. For this reason, a light amount loss owing to the light absorption of the substrate of the liquid crystal cell and the polarizing member is small. Note that, as described above, the liquid crystal layer rarely absorbs light.

Therefore, according to the liquid crystal display device, light is colored without using a color filter to obtain colored light having a high luminance, and a light amount loss owing to the light absorption of the substrate of the liquid crystal cell and the polarizing member is reduced, thereby obtaining a bright display.

In this liquid crystal display device, a liquid crystal molecule aligned state is changed depending the magnitude of a voltage applied across the electrodes of both the substrates of the liquid crystal cell, thereby changing the birefringence property of the liquid crystal layer. For this reason, when the voltage applied to the liquid crystal cell is controlled, colored light having the polarized state changed by the birefringence effect of the polarizing layer, transmitted through the polarizing member, and emerging from the liquid crystal display device can be changed in color. Therefore, a plurality of desired colors can be displayed by one pixel.

According to another aspect of the present invention, a color liquid crystal display device has a transparent first substrate having a transparent electrode formed on a front surface of the transparent first substrate, a second substrate arranged to oppose the first substrate and having an electrode formed on an inner surface opposing the transparent electrode, a liquid crystal layer sandwiched between the first and second substrates and having a predetermined initial aligned state, a polarizing member arranged on a first substrate side of the liquid crystal layer, a retardation plate arranged between the liquid crystal layer and the polarizing member such that a retardation axis of the retardation plate with respect to a transmission axis of the polarizing member not to be parallel or perpendicular to the transmission axis, and a reflecting member arranged on a liquid crystal layer side of the second substrate.

In the color liquid crystal display device having the retardation plate, while linearly polarized light incident through the polarizing member sequentially passes through the retardation plate having the retardation axis obliquely shifted with respect to the transmission axis of the polarizing member and the liquid crystal layer of the liquid crystal cell, the polarized state of the linearly polarized light is changed by the birefringence effects of the retardation plate and the liquid crystal layer, and this light is reflected by the reflecting member arranged on the liquid crystal layer side of the second substrate of the liquid crystal cell. While the reflected light passes through the liquid crystal layer and the retardation plate, the reflected light is changed into light having a polarized state different from the polarized state of the linearly polarized light and incident on the polarizing member. Light having a polarized light component transmitted through the polarizing member emerges as colored light.

More specifically, this liquid crystal display device colors light using the birefringence effects of the retardation plate and the liquid crystal layer of the liquid crystal cell without using a color filter, and the retardation plate and the liquid crystal layer only change the polarized state of the transmitted light and slightly absorb the light. For this reason, the amount of colored light having the polarized state changed by these birefringence effects, transmitted through the polarizing member, and emerging from the polarizing member is almost equal to the light amount of light in the wavelength band of the colored light of the linearly polarized light incident through the polarizing member. For this reason, colored light having a high luminance can be obtained.

A retardation plate is arranged between the liquid crystal cell and the front polarizing member. In this case, when a voltage at which the liquid crystal molecules are raised/aligned perpendicularly to the substrate surface is applied to the liquid crystal cell, i.e., when the apparent birefringence effect of the liquid crystal layer is almost zero, colored light can be obtained by the birefringence effect of the retardation plate. In addition, an influence of a change in temperature on a color display can be smaller in a case wherein no retardation plate is used than in a case wherein the retardation plate is used, and a display having deep colors can be obtained. Note that two or more retardation plates may be arranged to overlap each other.

According to still another object of the present invention, a color liquid crystal display device has a transparent first substrate having a transparent electrode formed on a front surface of the transparent first substrate, a second substrate arranged to oppose the first substrate and having an electrode formed on an inner surface opposing the transparent electrode, a liquid crystal layer sandwiched between the first and second substrates and having a predetermined initial aligned state, a polarizing member arranged on a first substrate side of the liquid crystal layer such that a transmission axis of the polarizing member is shifted by a predetermined angle with respect to a liquid crystal molecule aligning direction on the first substrate side of the liquid crystal layer not to be parallel or perpendicular to the liquid crystal molecule aligning direction, a semitransparent reflecting member arranged on a liquid crystal layer side of the second substrate, and a second polarizing member arranged on a second substrate side of the semitransparent reflecting member.

Such a color liquid crystal display device can have a reflection display function using external light and a transmission display function using light from an internal light source. More specifically, a reflection display using external light is performed at a bright place where an amount of external light is sufficiently large. At this time, the external light incident on the front surface side of the liquid crystal display device is changed into linearly polarized light by the polarizing function of the first polarizing member arranged on the front surface side of the liquid crystal cell, and the linearly polarized light is incident on the liquid crystal cell. At the same time, light passing through the liquid crystal cell is incident on the semitransparent reflecting member arranged on the liquid crystal layer side of the second substrate of the liquid crystal cell, and light reflected by the semitransparent reflecting member passes through the liquid crystal cell again and is incident on the first polarizing member. Light transmitted through the polarizing member emerges from the front surface side of the liquid crystal display device as image light.

The liquid crystal display device can perform a display using light from the light source even at a dark place where an amount of external light is small. In this case, the light from the light source is changed into linearly polarized light by the polarizing function of the second polarizing member arranged on the rear surface side of the liquid crystal cell, and the linearly polarized light is incident on the rear surface side of the liquid crystal cell and light transmitted through the semitransparent reflecting member is incident on the first polarizing member through the liquid crystal layer. Light passing through the polarizing member emerges from the front surface side of the liquid crystal display device as image light.

More specifically, in the liquid crystal display device, the semitransparent reflecting member is arranged on the inner surface of the second substrate of the liquid crystal cell. For this reason, in a reflection display using external light, the liquid crystal display device has a polarizing function in which light incident on the first polarizing member arranged on the front surface side of the liquid crystal cell is changed into linearly polarized light and an analyzing function in which light passing through the liquid crystal layer of the liquid crystal cell is changed into image light, and performs a display without using the second polarizing member arranged on the rear surface side of the liquid crystal cell. According to the liquid crystal display device, a reflection display using light from external light can be performed such that an amount of exit light is not lost by the second polarizing member arranged on the rear surface side of the liquid crystal cell and the second substrate of the liquid crystal cell. For this reason, a light amount loss owing to light absorption of the polarizing member and the substrate of the liquid crystal cell can be reduced in the reflection display using external light, and a display in the reflection display can be sufficiently bright.

According to each of the three aspects of the present invention, a plurality of pixel electrodes and a plurality of active elements respectively corresponding to the plurality of pixel electrodes are preferably formed in a matrix on the inner surface of one of the first and second substrates, and a counter electrode is formed on the inner surface of the other substrate.

A conventional active matrix color liquid crystal display device requires a high-accuracy and very expensive color filter whose elements respectively correspond to a large number of pixels. However, an active matrix color liquid crystal display device using an electric field control birefringence effect according to the present invention does not require such a color filter at all. In this color liquid crystal display device, a desired color can be displayed by each of the large number of pixels arranged in a matrix. For this reason, a display for performing a higher-definition display operation than that of a conventional matrix color liquid crystal display device which requires three pixels to display one desired color can be obtained.

In this case, the electrode arranged on the second substrate may also be used as a reflecting member. More specifically, when the pixel electrodes and active elements are arranged on the second substrate side, the pixel electrodes are also used as a reflecting member such as a reflecting film or a semitransparent film. When the pixel electrodes and active elements are arranged on the first substrate side, the counter electrode is also used as the reflecting member or the semitransparent film.

According to the color liquid crystal display device having the above arrangement, when the display device has a reflection display function, light incident on the first substrate side, reflected by the electrode arranged on the second substrate, and emerging from the first substrate side of the display device, in these processes, passes the first substrate of the liquid crystal cell, the liquid crystal layer, and one polarizing member twice, or passes through the first substrate, the liquid crystal layer, the retardation plate, and one polarizing member twice. Therefore, a light amount loss owing to the light absorption of the second substrate of the liquid crystal cell and the polarizing member arranged on the rear surface side of the second substrate can be smaller than that is a conventional color liquid crystal display device, and a bright image can be obtained.

Capacitor electrodes can be arranged on the second substrate side of the pixel electrodes to oppose the pixel electrodes via an insulating film.

In this manner, compensation capacitors for compensating for the holding voltage of pixels in a non-selection state can be constituted by the capacitor electrodes, the pixel electrodes, and the insulating film therebetween. In this case, the pixel electrodes can be constituted by transparent electrodes, and the capacitor electrodes can also be used as a reflecting member.

When the pixel electrodes are constituted to also serve as the light reflecting-member, light is reflected by the pixel electrodes. For this reason, even when the capacitor electrodes arranged on the second substrate side of the pixel electrodes are metal electrodes, the light is not shielded by the capacitor electrodes. Therefore, even when the capacitor electrodes are formed to have large areas, the opening ratio of the liquid crystal display device does not decrease. For this reason, a bright display can be obtained, a bright display can be obtained, and the compensation capacitors Cs of the pixels having sufficiently large capacitances can be assured.

When the pixel electrodes are constituted to also serve as the light reflecting-member, the active elements arranged on the inner surface of the second substrate are covered with a substantially even insulating film, the pixel electrodes also used as the reflecting member are arranged on the insulating film such that a part or parts of the pixel electrodes are arranged to overlap the active elements and respectively connected to the corresponding active elements.

With the above arrangement, the pixel electrodes need not be formed to the active elements. For this reason, the pixel electrodes are formed such that parts of the pixel electrodes overlap the active elements, thereby increasing the area of the pixel electrodes. Therefore, the opening ratio of the pixels can be increased, and a bright display can be obtained.

The reflecting member, can be arranged independently of the pixel electrodes. More specifically, the plurality of active elements arranged on the inner surface of the second substrate are covered with a substantially even insulating film, and the pixel electrodes are arranged on the insulating film such that a part or parts of the pixel electrodes are arranged to overlap the active elements. The reflecting member is arranged between the pixel electrodes and the active elements, and the pixel electrodes are connected to the active elements through holes and the like formed in the insulating film, respectively.

In addition, a second polarizing member can be arranged between the reflecting member and the pixel electrodes.

As the first or second polarizing member, a member consisting of a mixture of a polymer liquid crystal and a dichroic dye in which molecules are arranged in a predetermined direction may be used.

At least one light-scattering member is preferably arranged on an optical path through which light incident on the display device emerges.

With the above arrangement, a display screen having uniform brightness can be obtained, and the face of a display operator or his background can be prevented from appearing on the reflecting surface.

When the retardation plate is used, molecules of the liquid crystal layer are preferably twisted and aligned at an angle of 90° between both the substrates, the transmission axis of the polarizing member has about 45° with respect to an aligning direction of liquid crystal molecules of the liquid crystal layer adjacent to the second substrate, and the optical axis of the retardation plate has about 140° with respect to the aligning direction of the liquid crystal molecules of the liquid crystal layer adjacent to the second substrate.

A product $\Delta n \cdot d$ of a refractive index anisotropy $\Delta n$ and a film thickness d of a liquid crystal constituting the liquid crystal layer can be set to be about 1,000 nm, and a retardation value of the retardation plate can be set to be about 600 nm.

In this manner, desired colors of red, green, blue, white, and the like can be displayed by one pixel.

Molecules of the liquid crystal layer are twisted and aligned at an angle of about 90°, the transmission axis of the polarizing member has about 170° with respect to an aligning direction of liquid crystal molecules of the liquid crystal layer adjacent to the second substrate, and the optical axis of the retardation plate can be arranged in a direction having an angle of about 150° with respect to the aligning direction of the liquid crystal molecules of the liquid crystal layer adjacent to the second substrate.

A product $\Delta n \cdot d$ of a refractive index anisotropy $\Delta n$ and a film thickness d of a liquid crystal constituting the liquid crystal layer can be about 980 nm, and a retardation value of the retardation plate can be set to be about 370 nm.

In this manner, in a reflection display using external light, a display can be obtained such that the display color of each pixel is changed into red, blue, green, black, and white in accordance with a voltage applied to the liquid crystal cell. In a transmission display using light from a light source, a display can be obtained such that the display color of each pixel is changed to red, green, blue, and white.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention will be sufficiently apparent from the following detailed description and the accompanying drawings. However, the drawings are used for only explanation and do not limit the scope of the invention.

DETAILED DESCRIPTION OF THE PREFERRED EMBODIMENTS

Figure 1:
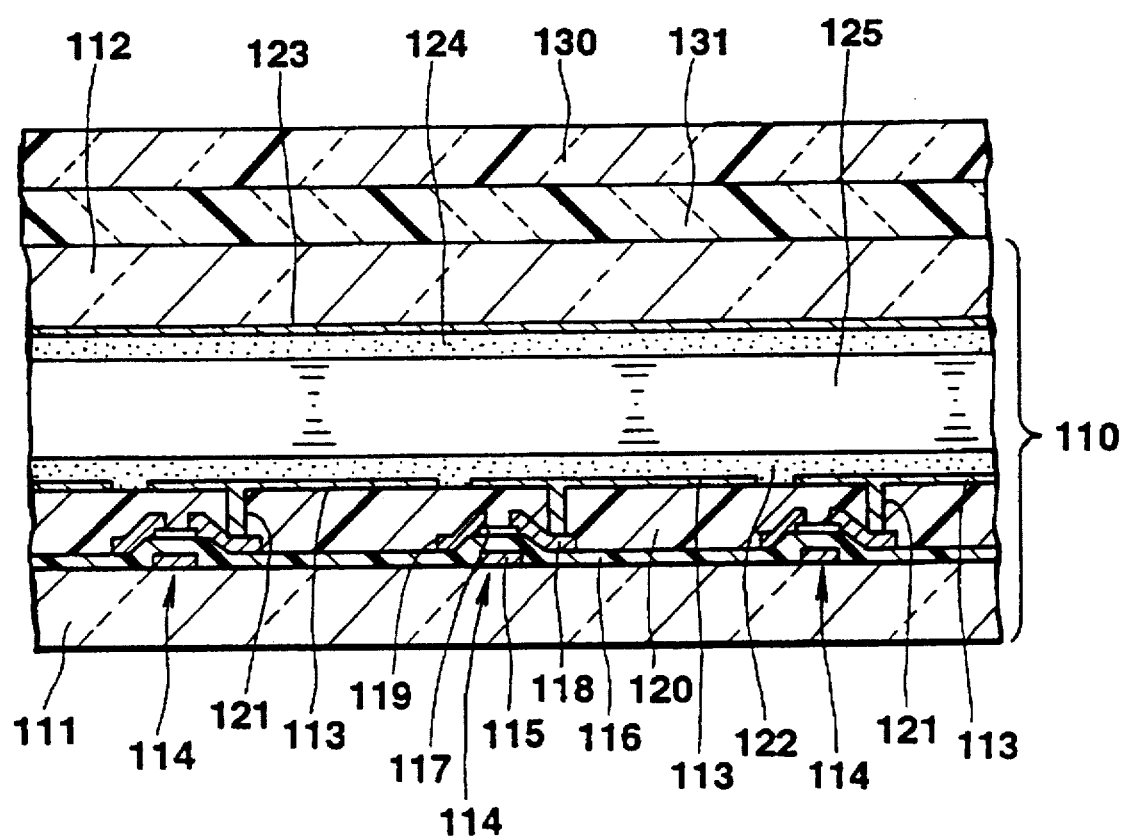
FIG. 1 is a longitudinal sectional view of an active matrix color liquid crystal display device showing the first embodiment of the present invention.

FIG. 1 shows an active matrix color liquid crystal display device according to the first embodiment of the present invention.

This color liquid crystal display device is constituted by a liquid crystal cell 110, one polarizing plate 130, and one retardation plate 131. The polarizing plate 130 is arranged on the front surface side of the liquid crystal cell 110, and the retardation plate 131 is arranged between the liquid crystal cell 110 and the polarizing plate 130.

In the active matrix liquid crystal cell 110 of this embodiment, a liquid crystal 125 of which molecules are twisted and aligned between a pair of substrates 111 and 112 is used.

Of the pair of substrates 111 and 112 opposing each other via the liquid crystal layer of the liquid crystal cell 110, the second substrate (lower substrate in FIG. 1) 111 is an insulating substrate (need not be transparent) consisting of a glass plate or the like. A plurality of pixel electrodes 113 arranged in a matrix in row and column directions and a plurality of active elements 114 respectively corresponding to the pixel electrodes 113 are provided on the inner side of the second substrate 111, i.e., the surface of the second substrate 111 opposing the liquid crystal layer. A transparent aligning film 122 is provided on the pixel electrodes 113.

The active elements 114 are, e.g., TFTs (thin film transistors). Each TFT 114 is constituted by a gate electrode 115 formed on the second substrate 111, a gate insulating film 116 covering the gate electrode 115, a semiconductor film 117 formed on the gate insulating film 116 to oppose the gate electrode 115 and consisting of a-Si (amorphous silicon) or the like, and source and drain electrodes 118 and 119 formed at both the end portions of the semiconductor film 117.

Although not shown, a gate line (address line) for supplying a gate signal to each TFT 114 and a data line for supplying a data signal corresponding to image data to each TFT 114 are arranged on the second substrate 111. The gate electrode 115 of each TFT 114 is formed integrally with the gate line, and the drain electrode 119 is connected to the data line.

A protective insulating film 120 covering all the TFTs 114 arranged on the substrate 111 is formed on the second substrate 111 to make the protective insulating film 120 even. The pixel electrodes 113 are arranged on the even surface of the protective insulating film 120.

Each pixel electrode 113 extends from the upper portion of a corresponding one of the TFTs 114 to almost the adjacent TFT 114, and is formed to partially overlap the upper portion of the corresponding TFT 114. The pixel electrode 113 is connected to the source electrode 118 of the corresponding TFT 114 through a corresponding one of contact holes 121 formed in the protective insulating film 120.

Each pixel electrode 113 consists of a reflecting film formed of a metal film such as an Al (aluminum) film having a high reflectance, and its surface is subjected to a roughening process to scatter and reflect an incident light.

The first substrate (upper substrate in FIG. 1) 112 of the liquid crystal cell 110 is a transparent substrate (glass plate in FIG. 1) consisting of a glass plate, a transparent resin film, or the like. A transparent counter electrode 123 opposing all the pixel electrodes 113 on the second substrate 111 is arranged on the inner surface of the first substrate 112, i.e., the surface of the first substrate 112 opposing the liquid crystal layer. A transparent aligning film 124 is arranged to cover the counter electrode 123.

Although not shown, the second substrate 111 and the first substrate 112 are joined with each other at their edge portions through a frame-like seal member. The livid crystal 125 is filled in an area surrounded by the seal member between both the substrates 111 and 112.

The liquid crystal 125 is a nematic liquid crystal having a positive dielectric anisotropy. The aligning directions of the molecules of the liquid crystal 125 are restricted on the substrates 111 and 112 by the aligning films 122 and 124 arranged on the substrates 111 and 112, respectively, and the molecules are twisted and aligned between both the substrates 111 and 112. Note that the aligning films 122 and 124 are homogeneous aligning films consisting of polyimide or the like, and their surfaces are subjected to an aligning treatment by rubbing.

The retardation plate 131 consists of a uniaxially stretched film such as a polycarbonate film. This retardation plate 131 is arranged between the polarizing plate 130 arranged on the front surface side of the liquid crystal cell 110 and the liquid crystal cell 110 such that the retardation axis (stretching axis) of the retardation plate 131 is obliquely shifted at a predetermined angle with respect to the transmission axis of the polarizing plate 130.

Note that retardation plate 131 is fixed on the front surface of the liquid crystal cell 110 (the outer surface side of the first substrate 112), and the polarizing plate 130 is adhered to the front surface of the retardation plate 131.

In the liquid crystal display device according to this embodiment, the aligning directions (the rubbing directions of the aligning films 122 and 124) of the liquid crystal molecules on both the substrates 111 and 112 of the liquid crystal cell 110, the direction of the transmission axis of the polarizing plate 130, and the direction of the optical axis (phase delay axis or phase advance axis) of the retardation plate 131 are set as follows.

In the embodiment, the liquid crystal molecule aligning direction on the second substrate 111 of the liquid crystal cell 110 is set to be a direction having an azimuth angle of 0°. With reference to this direction, the liquid crystal molecule aligning direction on the first substrate 112, the direction of the transmission axis of the polarizing plate 130, and the direction of the retardation axis of the retardation plate 131 are set.

Figure 2A:
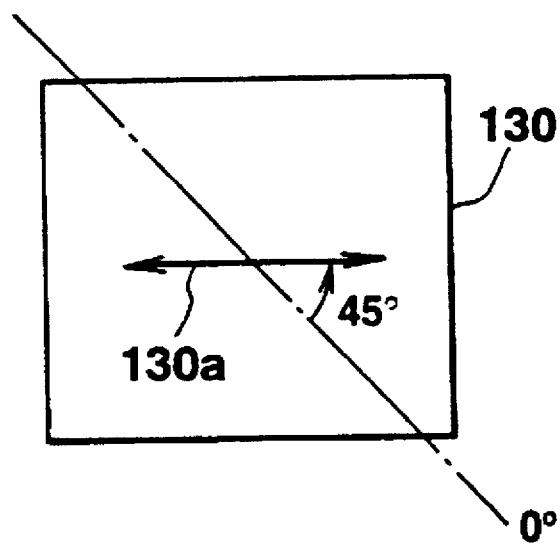
FIG. 2A is a plan view showing the relationship between a liquid crystal molecule aligning direction on a second substrate of a liquid crystal cell and the transmission axis of a polarizing plate in the liquid crystal display device in FIG. 1.
Figure 2B:
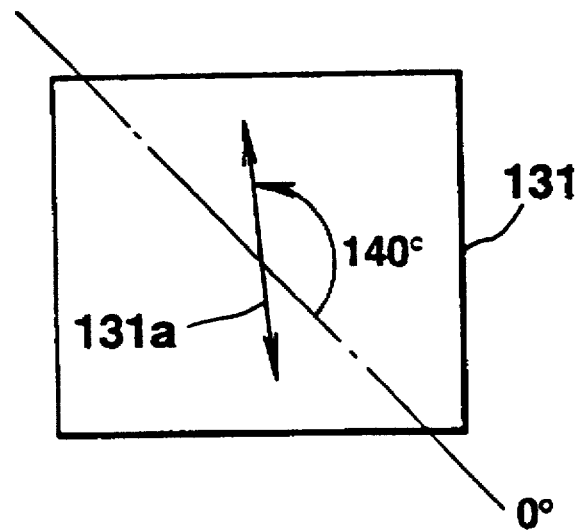
FIG. 2B is a plan view showing the relationship between the liquid crystal molecule aligning direction and a retardation axis of a retardation plate.
Figure 2C:
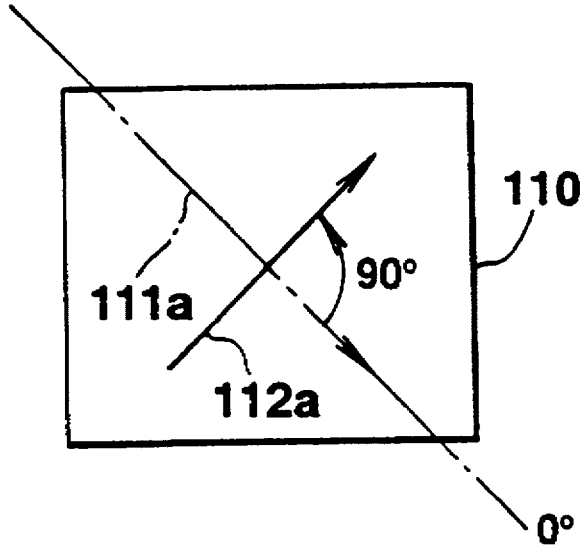
FIG. 2C is a plan view showing the relationship between liquid crystal molecule aligning directions on the first and second substrates.

FIGS. 2A to 2C are plan views respectively showing the liquid crystal molecule aligning direction of the liquid crystal cell 110, the transmission axis of the polarizing plate 130, and the retardation axis of the retardation plate 131. As shown in FIG. 2C, a liquid crystal molecule aligning direction 112a on the first substrate 112 of the liquid crystal cell 110 is shifted counterclockwise by about 90° with respect to a liquid crystal molecule aligning direction 111a on the second substrate 111, i.e., a direction having an azimuth angle of 0° when viewed from the front surface side of the liquid crystal display device. The liquid crystal molecules are twisted and aligned at a twist angle of about 90° between both the substrates 111 and 112.

Reference numeral 130a denotes the transmission axis of the polarizing plate 130; and 131a, the phase delay axis of the retardation plate 131. The transmission axis 130a of the polarizing plate 130 is shifted counterclockwise by about 45° with respect to a direction having an azimuth angle of 0° when viewed from the front surface side of the liquid crystal display device, and the phase delay axis 131a of the retardation plate 131 is shifted counterclockwise by about 140° with respect to the direction having the azimuth angle of 0° when viewed from the front surface side of the liquid crystal display device. Therefore, the phase delay axis 131a of the retardation plate 131 is obliquely shifted counterclockwise by about 95° with respect to the transmission axis 130a of the polarizing plate 130 when viewed from the front surface side of the liquid crystal display device.

In addition, in the liquid crystal display device of this embodiment, a product $\Delta n \cdot d$ of a refractive index anisotropy $\Delta n$ of the liquid crystal 125 of the liquid crystal cell 110 and a thickness d of the liquid crystal layer is set to be about 1,000 nm (e.g., a $\Delta n=0.2$ and d=5,000 nm), and the retardation value of the retardation plate is set to be, e.g., about 600 nm.

The above liquid crystal display device is a reflection liquid crystal display device in which light (natural light or light from an illumination light source) incident on the front surface side of the liquid crystal display device is reflected by the pixel electrodes 113 constituted by a reflecting film on the inner surface side of the second substrate 111 of the liquid crystal cell 110 to perform a display. The light incident on the front surface side is incident on the liquid crystal cell 110 through the polarizing plate 130 and the retardation plate 131 and then reflected by the pixel electrodes 113 through the liquid crystal layer of the liquid crystal cell 110. The reflected light emerges from the front surface side of the liquid crystal cell 110 through the liquid crystal layer. The light sequentially passes through the retardation plate 131 and the polarizing plate 130 finally and emerges from the liquid crystal display device.

The liquid crystal display device is driven such that the magnitude of a voltage applied across the pixel electrodes 113 of the second substrate 111 of the liquid crystal cell 110 and the counter electrode 123 of the first substrate 112 is controlled.

In the liquid crystal display device, the retardation axis 131a of the retardation plate 131 is obliquely shifted with respect to the transmission axis 130a of the polarizing plate 130. For this reason, while linearly polarized light incident through the polarizing plate 130 passes through the retardation plate 131, the polarized state of the linearly polarized light is changed by the birefringence effect of the retardation plate 131 to obtain elliptically polarized light. While this elliptically polarized light passes through the liquid crystal layer of the liquid crystal cell 110, the polarized state of the elliptically polarized light is changed by the birefringence effect of the liquid crystal layer, and this light is reflected by the pixel electrodes 113 constituted by the reflecting films on the inner surface side of the second substrate 111 of the liquid crystal cell 110. While this reflected light passes through the liquid crystal layer and the retardation plate 131, the polarized state of the reflected light is changed by the birefringence effects of the liquid crystal layer and the retardation plate 131, and this light is incident on the polarizing plate 130.

The reflected light incident on the polarizing plate 130 is nonlinearly polarized light whose polarized state has been changed by the birefringence effects of the retardation plate 131 and the liquid crystal layer. For this reason, of the nonlinearly polarized light, only light having the wavelength of a polarized light component transmitted through the polarizing plate 130 is transmitted through the polarizing plate 130 to emerge from the polarizing plate 130, and the exit light becomes colored light corresponding to the wavelength.

More specifically, in the liquid crystal display device, light is colored using the birefringence effects of the retardation plate 131 and the liquid crystal layer of the liquid crystal cell 110 without using a color filter. The retardation plate 131 and the liquid crystal layer only change the polarized state of transmitted light and rarely absorbs light. For this reason, the amount of colored light whose polarized state is changed by these birefringence effects, transmitted through the polarizing plate 130, and emerging from the polarizing plate 130 is slightly different from the amount of light in the wavelength band of the colored light of the linearly polarized light incident through the polarizing plate 130. Therefore, colored light having a high luminance can be obtained.

In addition, although the liquid crystal display device is of a reflection type, each pixel electrode 113 arranged on the inner surface of the second substrate 111 of the liquid crystal cell 110 is constituted by a reflecting film, and light is reflected by the pixel electrodes 113. For this reason, light incident on the front surface side of the liquid crystal display device, reflected by the pixel electrodes 113, and emerging from the front surface side of the liquid crystal display device, in these processes, passes through each of the first substrate 112 and the liquid crystal layer of the liquid crystal cell 110, the retardation plate 131, and the polarizing plate 130 only twice. Therefore, a light amount loss owing to the light absorption of the substrate of the liquid crystal cell 110 and the polarizing plate is small.

In a conventional reflection liquid crystal display device in which a pair of front and rear polarizing plates are arranged via a liquid crystal cell and a reflecting plate is arranged on the rear surface of the rear polarizing plate, light incident on the front surface side of the liquid crystal display device, reflected by the reflecting plate, and emerging from the front surface side again passes through each of the substrates of the liquid crystal cell twice, e.g., a total of four times, and passes through each of the front and rear polarizing plates twice, i.e., a total of four times. For this reason, light amount loss owing to the light absorption of the substrates of the liquid crystal cell and the polarizing plates is large. In contrast to this, in the liquid crystal display device of this embodiment, light incident on the front surface side of the liquid crystal display device and emerging from the front surface side again passes through the first substrate 112 of the liquid crystal cell 110 only twice and passes through the single polarizing plate 130 only twice. For this reason, a light amount loss owing to the light absorption of the substrate of the liquid crystal cell 110 and the polarizing plate is small.

In this embodiment, the counter electrode 123 and the aligning film 124 are arranged on the first substrate 112 of the liquid crystal cell 110, and the aligning film 122 is arranged on the pixel electrodes 113 (reflecting film) of the second substrate 111. For this reason, light passing through the liquid crystal cell 110 is subjected to light absorption by the first substrate 112 itself when the light passes through the first substrate 112, and the light is absorbed to some extent by the counter electrode 123 and the aligning film 124 and absorbed to some extent by the aligning film 122 on the second substrate 111. In contrast to this, in a conventional liquid crystal display device, light passing through a liquid crystal cell is absorbed by both substrates and electrodes and aligning films arranged on both the substrates. Therefore, a light amount loss including the light absorption of the electrodes and the aligning films is much larger in the conventional liquid crystal display device than in the liquid crystal display device of this embodiment.

In the liquid crystal display device of the embodiment, although light also passes through the retardation plate 131 and the liquid crystal layer of the liquid crystal cell 110, the light is rarely absorbed by the retardation plate 131 and the liquid crystal layer as described above. For this reason, a light amount loss caused by the retardation plate 131 and the liquid crystal layer is almost zero.

Therefore, according to the liquid crystal display device of the embodiment, light is colored without using a color filter to obtain colored light having a high luminance, and the light amount loss owing to the light absorption of the substrate of the liquid crystal cell 110 and the polarizing plate is reduced, thereby obtaining a bright display.

In a conventional liquid crystal display device, since a display color is determined depending on the color of a color filter, one desired color is displayed by three pixels. According to the liquid crystal display device of the embodiment, however, a desired color can be displayed by one pixel.

More specifically, in the liquid crystal display device of the embodiment, the aligned state of liquid crystal molecules is changed by the magnitude of a voltage applied across the electrodes 113 and 123 of both the substrates 111 and 112 of the liquid crystal cell 110, and the birefringence property of the liquid crystal layer is changed accordingly. For this reason, when the voltage applied to the liquid crystal cell 110 is controlled, colored light having a polarized state changed by the birefringence effects of the retardation plate 131 and the liquid crystal layer of the liquid crystal cell 110, transmitted through the polarizing plate 130, and emerging from the polarizing plate 130 can be changed in color. For this reason, a desired color can be displayed by each pixel. Therefore, a higher-definition image than that of a conventional color liquid crystal display can be obtained.

When the liquid crystal display device is to be driven, as in a case wherein an active matrix liquid crystal display device (TFTs are used as active elements) is to be driven, a reference signal having a waveform synchronized with a sync signal is supplied to the counter electrode 123 of the liquid crystal cell 110, a gate signal is sequentially supplied to gate lines in synchronism with the sync signal, and a data signal having a potential corresponding to image data is supplied to each data line in synchronism with the gate signal. When the potential of the data signal is controlled in accordance with the image data, a data signal having a potential corresponding to the image data is supplied to each pixel electrode 113 through the corresponding TFT 114, and a voltage corresponding to the pixel data is applied between each pixel electrode 113 and the counter electrode 123.

The display colors of the liquid crystal display device will be described below. As described above, the liquid crystal cell 110 is obtained by twisting and aligning liquid crystal molecules between both the substrates 111 and 112. The liquid crystal molecule aligning direction 112a on the first substrate 112 is shifted counterclockwise by about 90° with respect to the liquid crystal molecule aligning direction 111a on the second substrate 111 when viewed from the front surface side of the liquid crystal display device, the transmission axis 130a of the polarizing plate 130 is shifted counterclockwise by about 45° with respect to the liquid crystal molecule aligning direction 111a on the second substrate 111 when viewed from the front surface side of the liquid crystal display device, and the retardation axis 131a of the retardation plate 131 is shifted counterclockwise by about 140° with respect to the aligning direction 111a on the second substrate 111 of the liquid crystal cell 110 when viewed from the front surface side of the liquid crystal display device. In this case, when a value Δn·d of the liquid crystal cell 110 and the retardation value of the retardation plate 131 are about 1,000 nm and about 600 nm, respectively, red, green, blue, and white can be displayed by one pixel.

Figure 3:
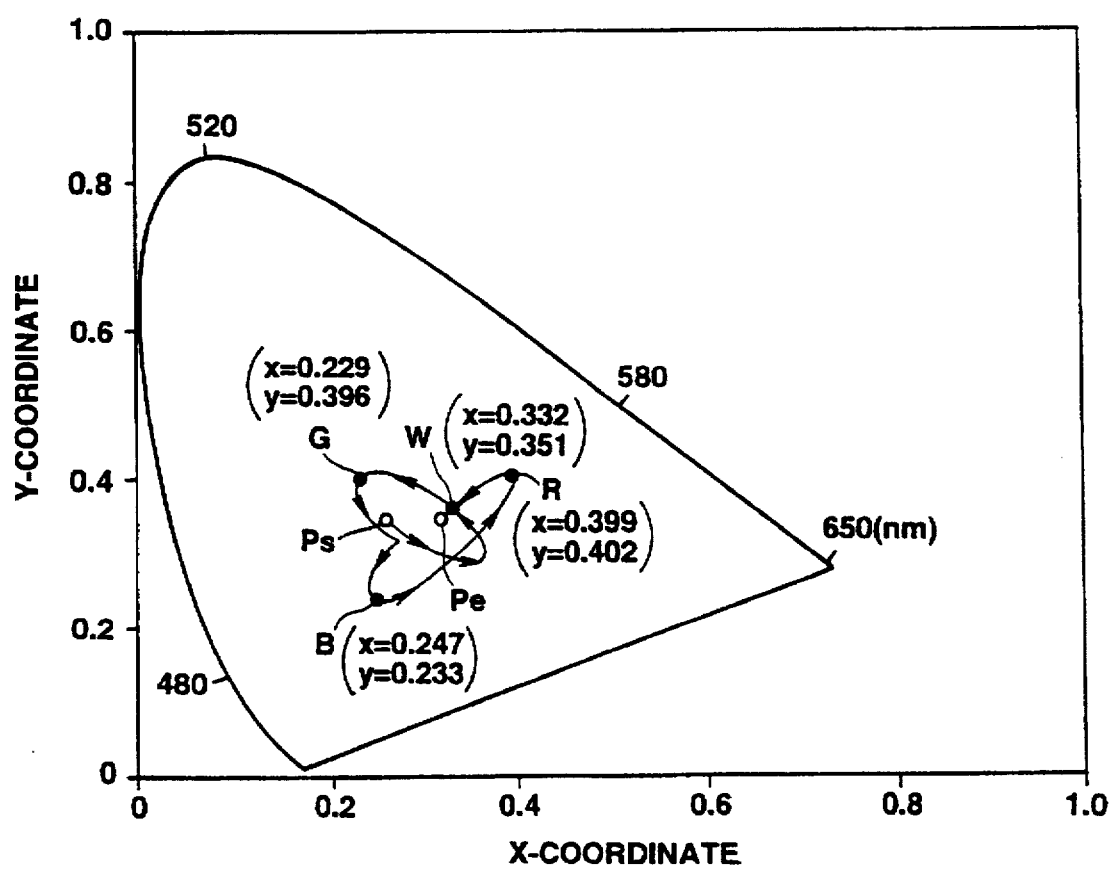
FIG. 3 is a CIE diagram of the liquid crystal display device.

FIG. 3 is a CIE diagram showing a change in color of exit light from the liquid crystal display device with respect to a voltage applied to the liquid crystal display device, and shows a result obtained such that white light is incident on the liquid crystal display device from a direction (orientation may be arbitrarily set) having 30° with respect to the normal to the display surface and light emerging from the liquid crystal display device is observed from the normal direction of the liquid crystal display device.

As shown in FIG. 3, in the above liquid crystal display device, as the value of a voltage applied across the electrodes 113 and 123 of the liquid crystal cell 110 is increased, the color of the exit light changes from a point Ps to a point Pe as indicated by an arrow. While the color changes from the point Ps to the point Pe, green (G), blue (B), red (R), and white (W), each having a high light intensity and a high color purity, are displayed.

The x- and y-coordinate values of the colors G, B, R, and W are as follows. That is, green (G) has x=0.229 and y=0.396, blue (B) has x=0.247 and y=0.233, red (R) has x=0.399 and y=0.402, and white (W) has x=0.332 and y=0.351. Each color has a sufficiently satisfactory color purity.

In the liquid crystal display device, as shown in FIG. 3, while the color of exit light changes from green (G) to blue (B), the color becomes almost white (W). However, when the color becomes almost white (W), a change in color is large with a change in voltage. Therefore, since voltage control for displaying this color is cumbersome, white (W) is preferably displayed by a voltage higher than a voltage at which the display color of red R is obtained.

As described above, in the liquid crystal display device, the color of the exit light becomes the colors of green (G), blue (B), red (R), and white (W) in accordance with a voltage applied to the liquid crystal display device. For this reason, red, green, blue, and white can be displayed by one pixel. In addition, when different colors are displayed by a plurality of adjacent pixels, a color obtained by mixing a plurality of colors selected from red, green, blue, and white can be displayed.

When the voltage applied to the liquid crystal display device is controlled to be a voltage value obtained while one color is changed into another color, not only the colors of red, green, blue, and white but also neutral tints can be displayed by each pixel, as a matter of course. In this manner, any desired color can be displayed by each pixel, and a high-definition display capable displaying colors whose number is three times that of the display of a conventional color display device can be obtained. However, a multilevel voltage must be stably controlled.

In the liquid crystal display device according to the embodiment, the TFTs 114 arranged on the second substrate 111 of the liquid crystal cell 110 are formed on the substrate 111, and the pixel electrodes 113 constituted by the reflecting films are arranged on the protective insulating film 120 covering the TFTs 114. For this reason, the pixel electrodes 113 need not be formed not to overlap the TFTs 114. Therefore, as shown in FIG. 1, each pixel electrode 113 is formed above a corresponding one of the TFTs 114 to partially overlap the TFT 114, and the area of the pixel electrode 113 can be increased. For this reason, a display can be made brighter by increasing the opening ratio of the pixels.

In this embodiment, the TFTs 114 are covered with the protective insulating film 120, and the pixel electrodes 113 are arranged on the protective insulating film 120. However, the pixel electrodes may be arranged parallel to the TFTs on the second substrate.

Figure 4:
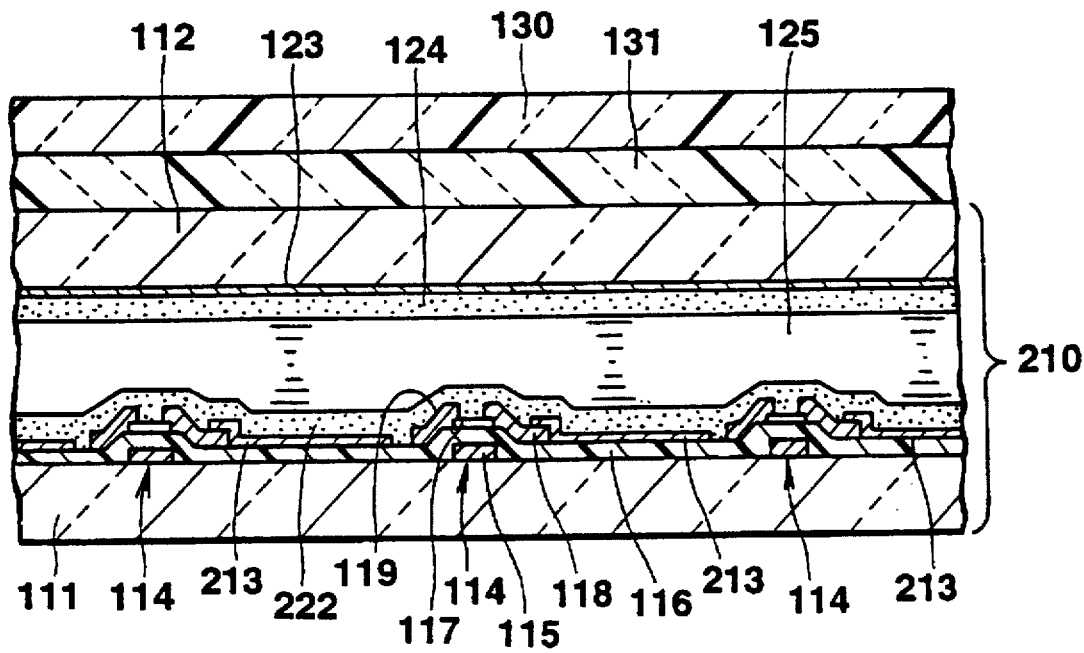
FIG. 4 is a longitudinal sectional view of a color liquid crystal display device showing the second embodiment of the present invention.

More specifically, FIG. 4 is a sectional view of part of an active matrix color liquid crystal display device showing the second embodiment of the present invention. In this embodiment, pixel electrodes 213 are formed on a gate insulating film 116 of TFTs 114 arranged on a second substrate 111 of liquid crystal cell 210, and the pixel electrodes 213 are directly connected to the source electrodes 118 of the TFTs 114, respectively. Note that reference numeral 222 denotes an aligning film arranged on the pixel electrodes 213 and the TFTs 114. The aligning film 222 consists of the same material as that of the aligning film 122 of the first embodiment, and is subjected to the same aligning treatment as that of the first embodiment.

Note that, in this embodiment, the protective insulating film 120 arranged on the second substrate 111 in the first embodiment is omitted, and the pixel electrodes 213 are arranged parallel to the TFTs 114. Since the remaining arrangement of the second embodiment is the same as that of the first embodiment, the same reference numerals as in the first embodiment denote the same parts in the second embodiment, and a repetitive description will be omitted.

In the second embodiment, since the pixel electrodes 213 are arranged parallel to the TFTs 114, the pixel electrodes 213 must be formed not to overlap the TFTs 114. For this reason, the opening ratio of pixels cannot be increased. However, the following other effects can be obtained as in the first embodiment. That is, light can be colored without using a color filter to obtain colored light having a high luminance. Although the liquid crystal display device is of a reflection type, a light amount loss owing to the light absorption of the substrate of the liquid crystal cell 210 and a polarizing plate can be reduced to obtain a bright display. A plurality of desired colors can be displayed by one pixel.

Figure 5:
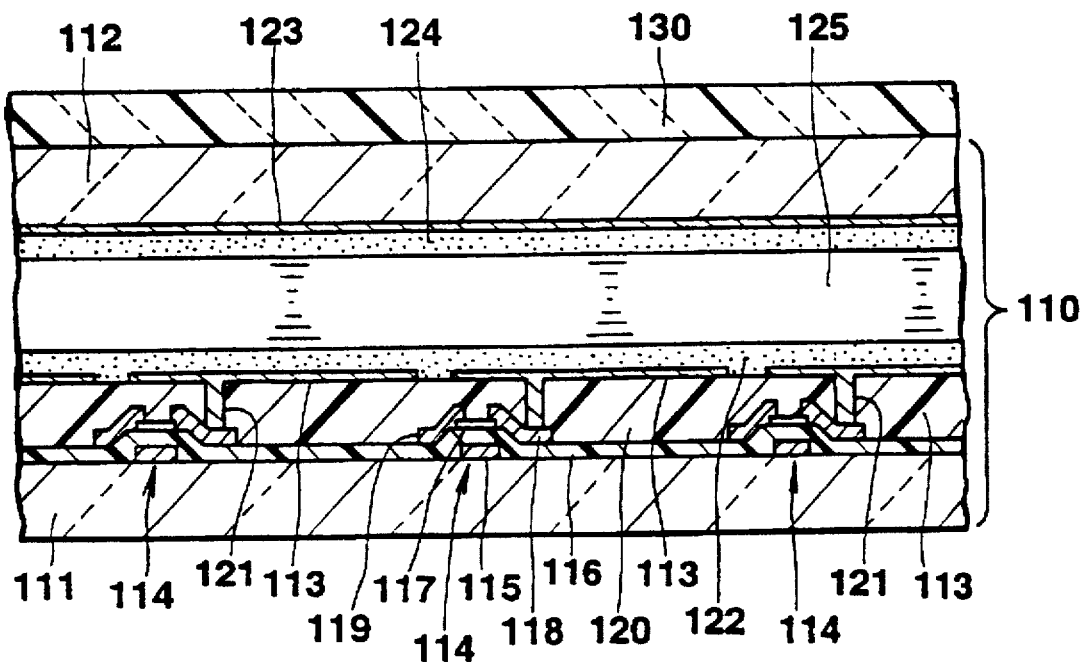
FIG. 5 is a longitudinal sectional view of a color liquid crystal display device showing the third embodiment of the present invention.

In each of the first and second embodiments, light is colored using the birefringence effects of the retardation plate 131 and the liquid crystal 125 of the liquid crystal cell and the polarizing and analyzing functions of the polarizing plate 130. However, as shown in FIG. 5 as the third embodiment, no retardation plate 131 is arranged, and light can be colored using the birefringence effect of a liquid crystal layer and the polarizing and analyzing functions of a polarizing plate 130. In this case, as in the first embodiment, a transmission axis 130a of the polarizing plate 130 must be obliquely shifted by a predetermined angle not to be perpendicular or parallel to a liquid crystal molecule aligning direction 112a on a first substrate 112 of the liquid crystal cell.

Figure 6:
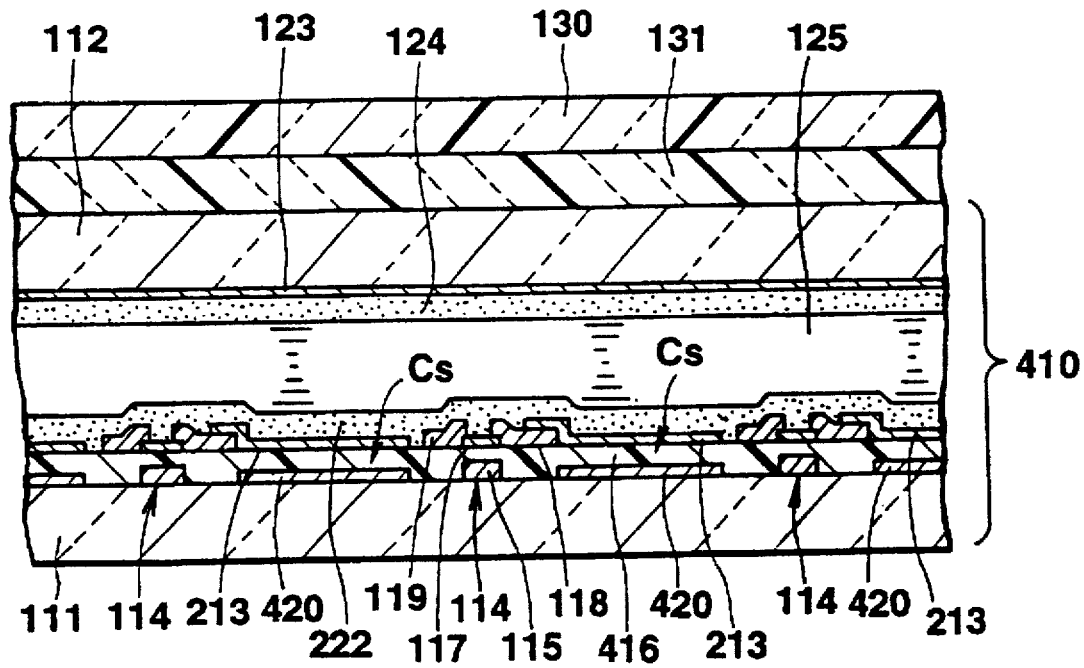
FIG. 6 is a longitudinal sectional view of a color liquid crystal display device showing the fourth embodiment of the present invention.

FIG. 6 is a sectional view of part of an active matrix color liquid crystal display device showing the fourth embodiment of the present invention. Note that this embodiment is obtained such that a capacitor electrode is arranged to oppose each pixel electrode between a second substrate 111 and a gate insulating film 416 arranged thereon in the second embodiment. The remaining arrangement is almost the same as that of the second embodiment.

In this embodiment, the gate insulating film 416 is formed on the almost entire surface of the substrate 111. Although not shown, as in the second embodiment, a gate line (address line) for supplying a gate signal to a gate electrode 115 of each TFT 114 and a data line for supplying a data signal corresponding to image data to a drain electrode 119 of each TFT 114 are arranged on the second substrate 111.

The gate line is formed integrally with the gate electrodes 115 of the TFTs 114 on the substrate 111, and the gate line is covered with the gate insulating film 416 except for the terminal portions of the gate line. In addition, the data line is formed on the gate insulating film 416, and the data line is connected to the drain electrodes 119 of the TFTs 114.

Pixel electrodes 213 are formed on the gate insulating film 416, and each pixel electrode 213 has one terminal portion connected to a source electrode 118 of a corresponding one of the TFTs 114. The pixel electrode 213 is constituted by a reflecting film consisting of a metal film such as an Al film having a high reflectance, and its front surface is subjected to a toughening process to diffuse and reflect light.

Capacitor electrodes 420 respectively opposing the pixel electrodes 213 are arranged on the rear sides of the pixel electrodes 213 via the gate insulating film 416. Compensation capacitors Cs for compensating for holding voltages of pixels during a non-selection period are constituted by the capacitor electrodes 420, the pixel electrodes 213, and the gate insulating film 416 arranged therebetween.

The capacitor electrodes 420 are arranged on the second substrate 111. The capacitor electrodes 420, the gate electrodes 115 of the TFTs 114, and a gate line are simultaneously formed such that one metal film such as a Cr- or Al-based alloy film is formed on the second substrate 111 by a sputtering apparatus or the like and this metal film is patterned by a photography method.

In this embodiment, each capacitor electrode 420 is formed to have a size almost equal to that of each pixel electrode 213, and the area between the capacitor electrode 420 and the pixel electrode 213 is increased, thereby increasing the capacitance of a corresponding one of the compensation capacitors Cs.

Although not shown, a reference potential connection line is arranged parallel to the gate line on the second substrate 111. The reference potential connection line is formed integrally with the capacitor electrodes 420, and each capacitor electrode 420 is connected to a reference potential through the reference potential connection line.

When the liquid crystal display device is to be driven, as in a case wherein an active matrix liquid crystal display device (TFTs are used as active elements) is to be driven, a reference signal having a waveform synchronized with a sync signal is supplied to the counter electrode 123 of a liquid crystal cell 410, a gate signal is sequentially supplied to gate lines in synchronism with the sync signal, and a data signal having a potential corresponding to image data is supplied to each data line in synchronism with the gate signal. When the potential of the data signal is controlled in accordance with the image data, a data signal having a potential corresponding to the image data is supplied to each pixel electrode 213 through the corresponding TFT 114 during the selection period of the pixels of each row, and charges from the pixel electrodes 213 are stored in the compensation capacitors Cs. Voltages corresponding to the stored charge amounts of the compensation capacitors Cs are applied between the pixel electrodes 213 and the counter electrode 123 during a non-selection period of the pixels.

In the liquid crystal display device of this embodiment, light is reflected by the pixel electrodes 213 arranged on the inner surface side of the second substrate 111. For this reason, even when the capacitor electrodes 420 arranged on the rear side of the pixel electrodes 213 are metal electrodes, the light is not shielded by the capacitor electrodes 420. Therefore, even when the capacitor electrodes 420 are formed to have large areas, the opening ratio of the liquid crystal display device does not decrease. For this reason, a bright display can be obtained, and the compensation capacitors Cs of the pixels having sufficiently large capacitances can be assured.

Note that, in the embodiment, although each capacitor electrode 420 is formed to have a size and a shape almost equal to those of each pixel electrode 213, the size of the capacitor electrode 420 may be arbitrarily selected. Each capacitor electrode 420 may be formed integrally with the gate line of the TFTs 114 respectively corresponding to the pixel electrodes 213 of the preceding row (previously selected row) of the pixel electrode 213 opposing the corresponding capacitor electrode 420, and the capacitor electrode 420 may be connected to a reference potential through the gate line.

Figure 7:
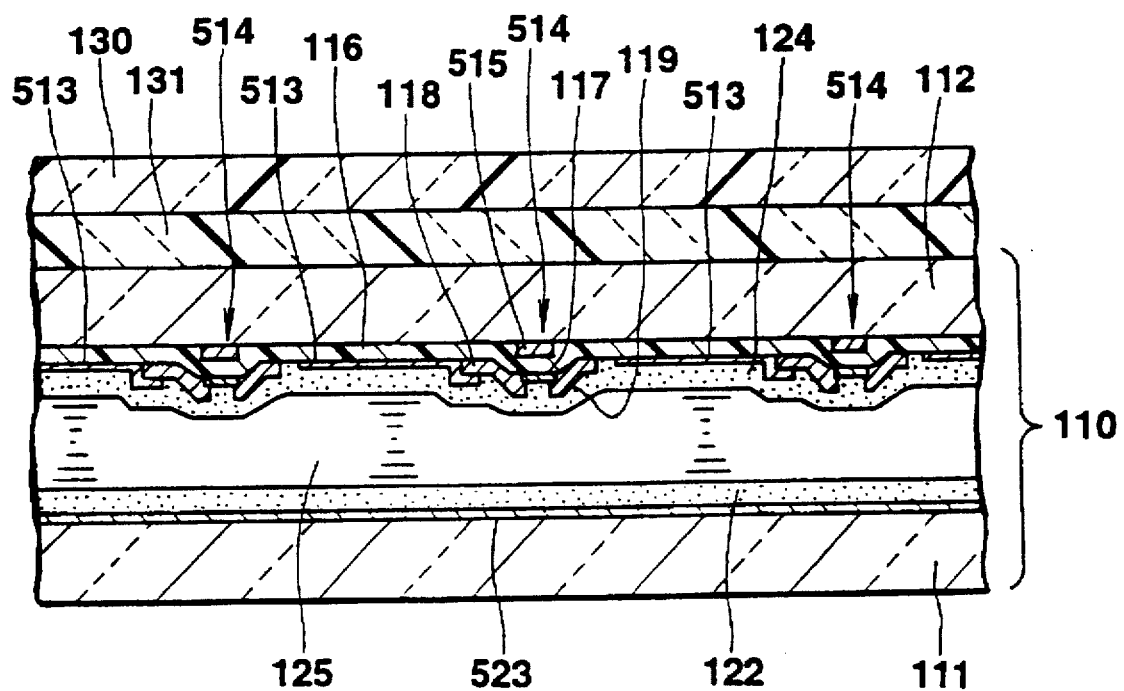
FIG. 7 is a longitudinal sectional view of part of a color liquid crystal display device showing the fifth embodiment of the present invention.

FIG. 7 is a sectional view of an active matrix color liquid crystal display device showing the fifth embodiment of the present invention.

According to the fifth embodiment, a plurality of pixel electrodes 513 and active elements 514 respectively corresponding thereto are formed on the inner surface side of a first substrate 112, and a counter electrode 523 is formed on a second substrate 111 and also used as a reflecting member. Since the remaining points are the same as those of the second embodiment, the same reference numerals as in the second embodiment denote the same parts in the fifth embodiment, and a repetitive description will be omitted.

Figure 8:
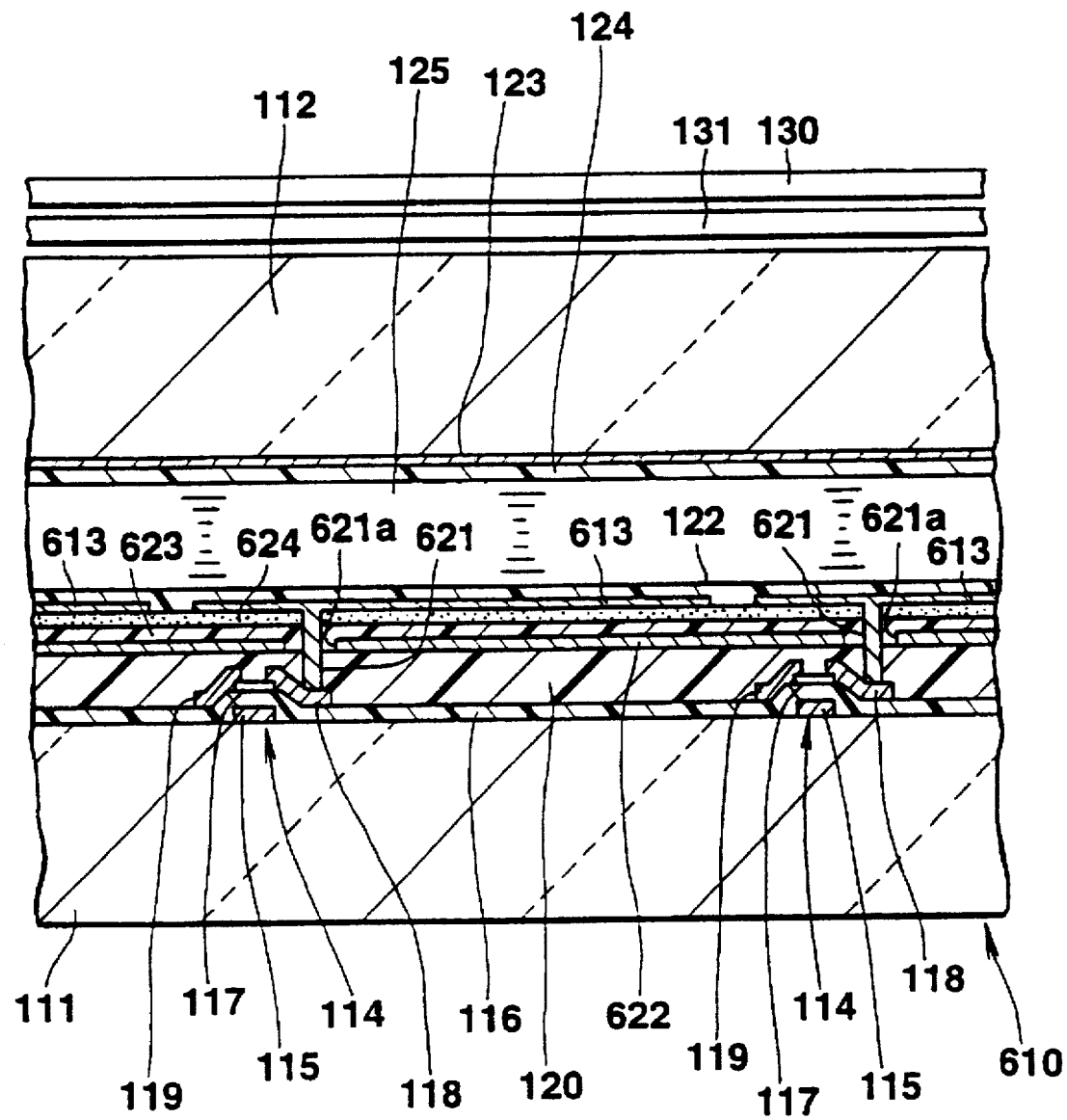
FIG. 8 is a longitudinal sectional view of a color liquid crystal display device showing the sixth embodiment of the present invention.

FIG. 8 is a sectional view of a liquid crystal display device showing the sixth embodiment of the present invention.

In this embodiment, as in the first embodiment, a retardation plate 131 is used, and the surface, of a second substrate 111, in contact with a liquid crystal is flattened using an insulating film 120 covering active elements to increase pixel electrodes in size. However, in the sixth embodiment, unlike in the first embodiment, a reflecting member is independently arranged not to use the pixel electrodes as reflecting members, and a second polarizing member is arranged between the reflecting member and the pixel electrodes.

Referring to FIG. 8, on a liquid crystal 125 side of a second substrate 111 of a pair of substrates 111 and 112 opposing each other via the liquid crystal layer of a liquid crystal cell 610, a plurality of pixel electrodes 613 are arranged in a matrix, and a plurality of active elements 114 respectively corresponding to the pixel electrodes 613 are arranged.

Although not shown, as in the first embodiment, on the second substrate 111, a gate line (address line) for supplying a gate signal to each TFT 114 and a data line for supplying a data signal corresponding to image data to each TFT 114 are arranged. Gate electrodes 115 of the TFTs 114 are formed integrally with the gate line, and drain electrodes 119 are connected to the data line.

On the inner surface side of the second substrate 111, the protective insulating film 120 covering all the TFTs 114 arranged on the substrate 111 is arranged. A reflecting film 622 consisting of a metal film such as an Al (aluminum) film is formed on the protective insulating film 120, an underlying film 623 having an alignment property is formed on the reflecting film 622, and a polarizing film 624 is formed on the underlying film 623.

The polarizing film 624 has the same polarizing function as that of a general polarizing plate. The polarizing film 624 consists of a mixture of, e.g., a polymer liquid crystal and a dichroic dye, and the molecules thereof are aligned in one direction. More specifically, since the underlying film 623 has an alignment property, the molecules of the polymer liquid crystal and dichroic dye of the polarizing film 624 are aligned in one direction.

The polarizing film 624 is formed by the following method.

The underlying film 623 is formed on the reflecting film 622 arranged on the second substrate 111. The underlying film 623 is an aligning film consisting of, e.g., polyimide. The underlying film 623 is formed such that a polyimide is coated on the reflecting film 622, and the surface of the polyimide film is subjected to a rubbing process in one direction. Alternatively, the underlying film 623 is formed such that a layer having a predetermined number of monomolecular films in which polyimide molecules are aligned in one direction is stacked on the reflecting film 622 by an LB (Langmuir-Blodgett) method.

A solution obtained such that a polymer liquid crystal and a dichroic dye are mixed and heated at a temperature at which the polymer liquid crystal has a nematic phase is coated on the underlying film 623, and the coated solution is cooled at a temperature lower than the nematic phase temperature.

In this manner, when the solution coated on the underlying film 623 and having the nematic phase temperature is cooled, the molecules of the polymer liquid crystal and dichroic dye of the solution are aligned in one direction by the alignment property of the underlying film 623, and the molecules are fixed in this aligned state, thereby forming the polarizing film 624.

In this case, after the solution is gradually cooled, the film surface may be rubbed in the same direction as that of the aligning direction of the underlying film 623. When this rubbing process is performed, the molecules of the polymer liquid crystal and dichroic dye can be more preferably aligned.

The pixel electrodes 613 arranged in a matrix on the inner surface side of the second substrate 111 are provided on the polarizing film 624, and a transparent aligning film 122 is arranged on the pixel electrodes 613.

The pixel electrodes 613 are transparent electrodes consisting of ITO or the like. The pixel electrodes 613 are connected to the source electrodes 118 of the TFTs 114 through contact holes 621 formed in the underlying film 623 and the protective insulating film 120.

Holes 621a each having a diameter larger than that of each contact hole 621 are formed in the reflecting film 622 corresponding to portions where the contact holes 621 are formed. The pixel electrodes 613 are insulated from the reflecting film 622 by the holes 621a.

In the liquid crystal cell 610, the liquid crystal 125, the aligning film 122, an aligning film 124, the aligning treatment of the aligning films 122 and 124, the retardation plate 131, the first substrate 112, and the like are the same as those of the first embodiment.

A polarizing plate 130 arranged on the front surface side of the liquid crystal cell 610 is a general polarizing plate obtained such that a material obtained by stacking a pair of rear and front transparent resin films via a layer of iodine, a dichroic dye, or a mixture thereof is stretched in one direction.

The liquid crystal display device of this embodiment is a reflection liquid crystal display device in which a display is performed using external light, as in the first embodiment. The liquid crystal display device is driven such that the magnitude of a voltage applied between the pixel electrodes 613 of the second substrate 111 of the liquid crystal cell 610 and a counter electrode 123 of the first substrate 112 is controlled.

This liquid crystal display device displays a color image using the birefringence effects of the retardation plate 131 and the liquid crystal layer of the liquid crystal cell 610. In this liquid crystal display device, the retardation axis of the retardation plate 131 is obliquely shifted with respect to the transmission axis of the polarizing plate 130. For this reason, while linearly polarized light incident through the polarizing plate 130 passes through the retardation plate 131, the polarized state of the linearly polarized light is changed by the birefringence effects to obtain elliptically polarized light. While this elliptically polarized light passes through the liquid crystal layer of the liquid crystal cell 610, the polarized state of the elliptically polarized light is changed by the birefringence effects, and this light is incident on the polarizing film 624 arranged on the inner surface side of the second substrate 111 of the liquid crystal cell 610.

The light incident on the polarizing film 624 is a nonlinearly polarized light whose polarized state has been changed by the birefringence effects of the retardation plate 131 and the liquid crystal layer. For this reason, of the nonlinearly polarized light, only light having the wavelength of a polarized light component transmitted through the polarizing film 624 is transmitted through the polarizing film 624 to obtain color image light having a color corresponding to the wavelength. This color image light is reflected by the reflecting film 622 on the inner surface side of the second substrate 111 of the liquid crystal cell 610, and the reflected light sequentially passes through the polarizing film 624, the liquid crystal layer, the retardation plate 131, and the polarizing plate 130, and emerges from the front surface side of the liquid crystal display device.

In this manner, in the liquid crystal display device of this embodiment, the aligned state of the liquid crystal molecules is changed by the magnitude of the voltage applied across the electrodes 613 and 123 of both the substrates 111 and 112 of the liquid crystal cell 610, and the birefringence property of the liquid crystal layer is changed accordingly. For this reason, when the voltage applied to the liquid crystal cell 610 is controlled, colored light having a polarized state changed by the birefringence effects of the retardation plate 131 and the liquid crystal layer of the liquid crystal cell 610 and transmitted through the polarizing film 624 can be changed in color. Therefore, as in the first embodiment, a desired color can be displayed by each pixel.

In the livid crystal display device of this embodiment, the reflecting film 622 is arranged on the inner surface side of the second substrate 111 of the liquid crystal cell 610, and the polarizing film 624 is arranged on the reflecting film 622. For this reason, no light passes through the second substrate 111 of the liquid crystal cell 610. Therefore, since a light amount loss is caused by only the first substrate 112 of the liquid crystal cell 610, a light amount loss caused by the substrates of the liquid crystal cell 610 can be reduced, and a bright display can be obtained.

Note that, in the liquid crystal display device of the embodiment, a color image is displayed using the birefringence effects of the retardation plate 131 and the liquid crystal layer of the liquid crystal cell 610. The present invention can also be applied to a liquid crystal display device in which the retardation plate 131 is not used.

Figure 9:
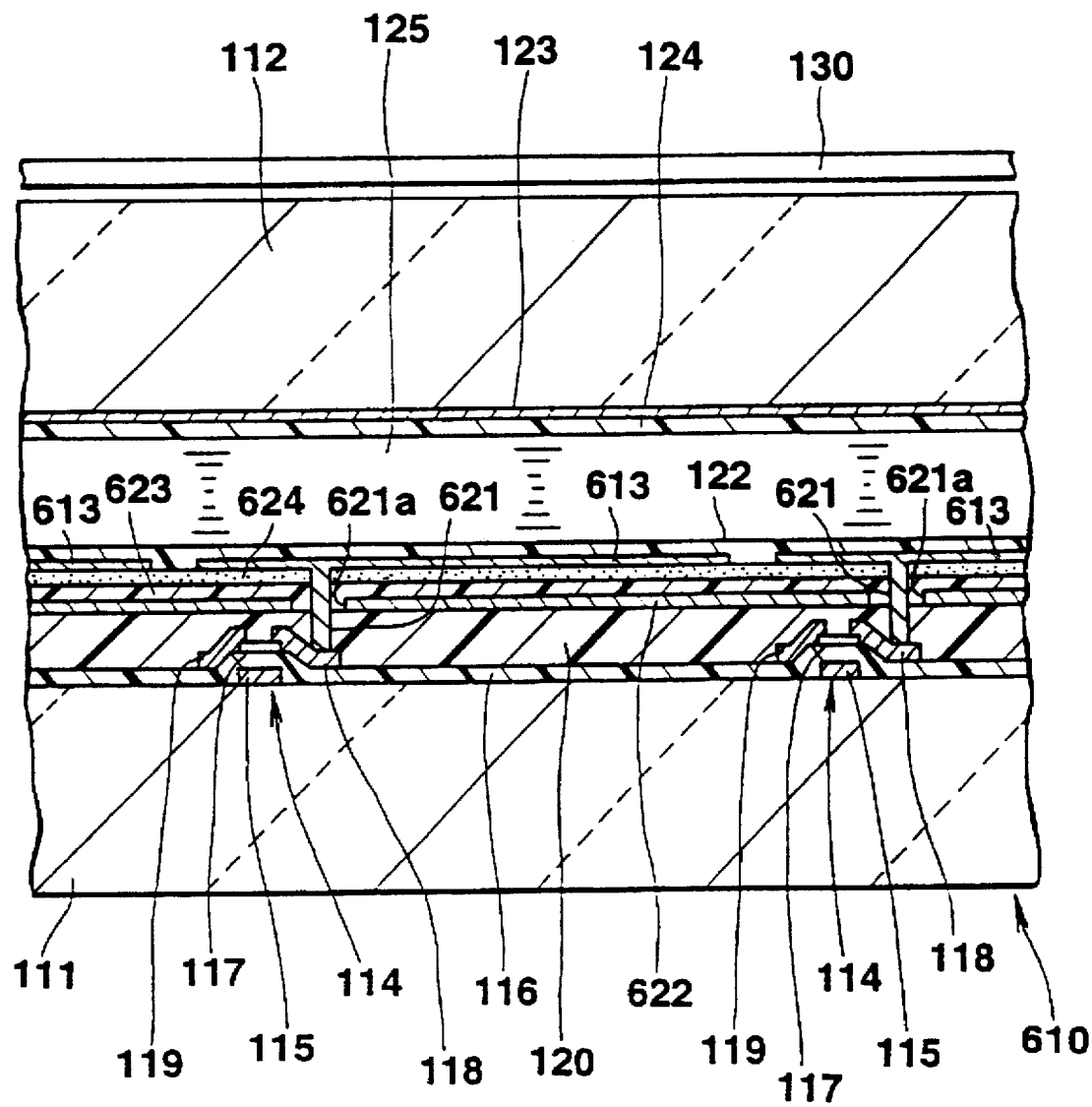
FIG. 9 is a longitudinal sectional view of a color liquid crystal display device showing the seventh embodiment of the present invention.

FIG. 9 is a sectional view of part of a liquid crystal display device showing the seventh embodiment of the present invention. The liquid crystal display device of this embodiment uses an ECB scheme in which a color image is displayed by electrically controlling the birefringence effect of the liquid crystal layer of a liquid crystal cell 610 Without using a retardation plate. The liquid crystal display device of this embodiment is obtained by removing a retardation plate 131 from the liquid crystal display device of the sixth embodiment described above, and the remaining arrangement is the same as that of the sixth embodiment. For this reason, the same reference numerals as in the sixth embodiment denote the same parts in the seventh embodiment, and a repetitive description will be omitted.

In this embodiment, a polarizing plate 130 is arranged such that its transmission axis is obliquely shifted by a predetermined angle with respect to the aligning direction (the rubbing direction of an aligning film 124) of liquid crystal molecules on a first substrate 112 of a liquid crystal cell, and a rear polarizing film 624 is arranged such that its transmission axis is obliquely shifted by a predetermined angle with respect to the aligning direction (the rubbing direction of an aligning film 122) of liquid crystal molecules on a second substrate 111 of the liquid crystal cell.

In each of the sixth and seventh embodiments, the polarizing film 624 arranged on the inner surface side of the second substrate 111 of the liquid crystal cell 610 is formed on the underlying film 623, the molecules of a polymer liquid crystal and a dichroic dye are aligned in one direction by the alignment property of the underlying film 623. However, the polarizing film 624 may be formed by the following method. That is, a solution obtained such that a polymer liquid crystal and a dichroic dye are mixed and heated at a temperature at which the polymer liquid crystal has a nematic phase is coated, and a unidirectional electric or magnetic field is applied the coated solution to align the molecules of the polymer liquid crystal and the dichroic dye in one direction. Thereafter, the solution is cooled to fix the aligned state of the liquid crystal molecules and the dye molecules. In this case, the underlying film 623 need not be arranged.

Note that, when the polarizing film 624 is to be formed by this method, the electric or magnetic field is preferably kept applied to the solution until the aligned state of the liquid crystal molecules and the dye molecules is fixed by cooling the solution.

The polarizing film 624 may be a polarizing film in which the molecules of iodine, a dichroic dye, or a mixture thereof used in a general polarizing plate are aligned in one direction. In this case, the substrate 111 may be vertically dipped in a solution of iodine, the dichroic dye, or the mixture thereof and pulled one direction to adhere the solution to the front surface of the reflecting film 622 of the substrate 111, thereby forming a polarizing film in which the molecules of iodine, the dichroic dye, or the mixture thereof are aligned in the substrate pulling direction.

The polarizing film 624 may be a general polarizing plate (the polarizing plate 130 formed on the front surface side of the liquid crystal cell 610). When the general polarizing plate is used as the polarizing film 624, the polarizing plate may be adhered to the reflecting film 622.

The second substrate structure as described above can be applied to not only a birefringence effect liquid crystal display device but also a liquid crystal display device using a TN or STN scheme.

Figure 10:
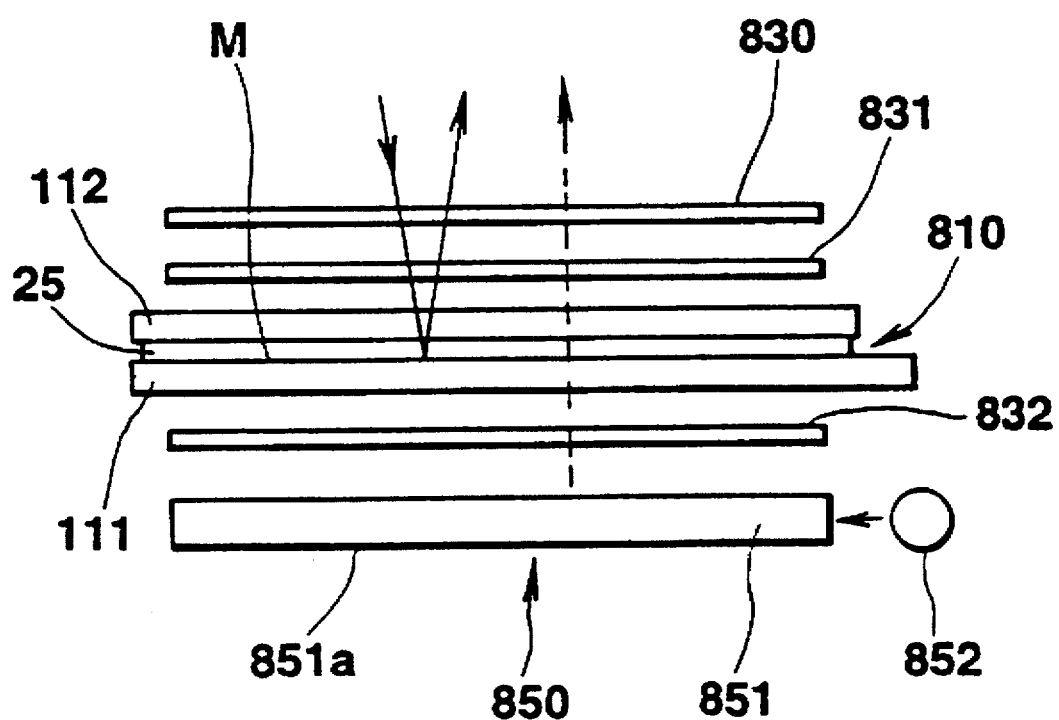
FIG. 10 is a view showing the basic arrangement of a color liquid crystal display device showing the eighth embodiment of the present invention.
Figure 11:
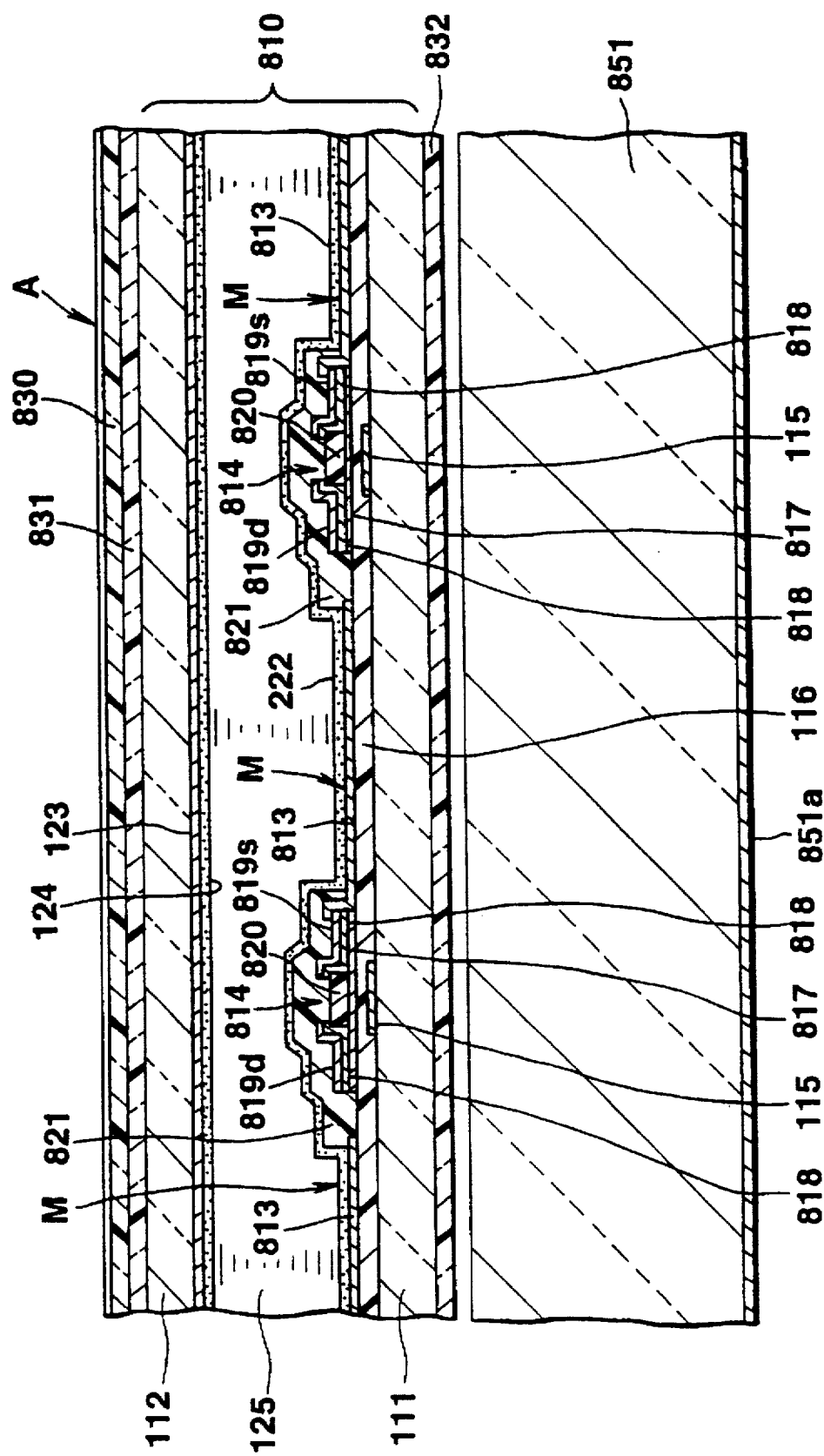
FIG. 11 is an enlarged sectional view of a color liquid crystal display device according to the eighth embodiment of the present invention.

FIGS. 10 to 23 show the eighth embodiment of the present invention. FIG. 10 is a view showing the basic arrangement of a liquid crystal display device, and FIG. 11 is an enlarged sectional view showing part of the liquid crystal display device in FIG. 10.

The liquid crystal display device of this embodiment uses a semitransparent reflecting member and has a reflection display function and a transmission display function to electrically control and change a birefringence effect, thereby displaying a color image. As shown in FIG. 10, a first polarizing plate (to be referred to as an front polarizing plate hereinafter) 830 is arranged on the front surface side of a liquid crystal cell 810, a second polarizing plate (to be referred to as a rear polarizing plate hereinafter) 832 is arranged on the rear surface side of the liquid crystal cell 810. A retardation plate 831 is arranged between the liquid crystal cell 810 and the front polarizing plate 830, and a light source 850 is arranged behind the rear polarizing plate 832.

The liquid crystal cell 810 will be described first. The liquid crystal cell 810 is an active matrix cell as shown in FIG. 11. In this embodiment, the liquid crystal cell 810 in which the molecules of a liquid crystal 125 are twisted and aligned between both substrates 111 and 112 is used.

The liquid crystal cell 810 is obtained by sandwiching the liquid crystal 125 between the pair of substrates 111 and 112 consisting of glass or the like. On the inner surface side, i.e., the surface opposing the liquid crystal layer, of the second substrate 111 of the pair of substrates 111 and 112, a plurality of pixel electrodes 813 and a plurality of active elements 814 respectively corresponding thereto are arranged in a matrix in row and column directions. A transparent aligning film 222 is formed on the pixel electrodes 813 and the active elements 814.

The active elements 814 are, e.g., TFTs (thin film transistors). Each TFT 814 is constituted by a gate electrode 115 formed on the second substrate 111, a gate insulating film 116 covering the gate electrode 115, an i-type semiconductor film 817 consisting of a-Si (amorphous silicon) or the like and formed on the gate insulating film 116 to oppose the gate electrode 115, and source and drain electrodes 819s and 819d formed on both the side portions of the i-type semiconductor film 817 through n-type semiconductor films 818 doped with an impurity and consisting of a-Si or the like. The TFT 814 is covered with a protective insulating film 821.

Note that reference numeral 820 denotes a blocking insulating film formed on the channel region of each i-type semiconductor film 817. The blocking insulating film 820 is formed to protect the i-type semiconductor film 817 when the n-type semiconductor film 818 is patterned.

The gate insulating film 116 of the TFTs 814 is a transparent insulating film consisting of SiN (silicon nitride) or the like, and is formed on the almost entire surface of the second substrate 111.

Although not shown, a gate line (address line) for supplying a gate signal to the gate electrode 115 of each TFT 814 and a data line for supplying a data signal corresponding to image data to the drain electrode 819d of each TFT 814 are arranged on the second substrate 111.

The gate lines are formed integrally with the gate electrodes 115 of the TFTs 814 on the substrate 111, and covered with the gate insulating film 116 except for the terminal portions of the gate lines. In addition, the data lines are formed on the gate insulating film 116, and connected to the drain electrodes 819d of TFTs 814.

Pixel electrodes 813 are formed on the gate insulating film 116 not to overlap the TFTs 814. Each pixel electrode 813 has one terminal portion connected to the source electrode 819s of a corresponding one of the TFTs 814.

The pixel electrodes 813 are also used as semitransparent reflecting films M, and their reflecting surfaces are almost mirror surfaces. The semitransparent reflecting films M, like a commercially available half mirror, reflects and transmits incident light at a certain reflectance and a certain transmittance, respectively. In this embodiment, as the pixel electrodes 813, semitransparent reflecting films M each having a transmittance of 5 to 20% are used. Note that the reflectance may be set to be 14% or more.

Each semitransparent reflecting film M is constituted by a metal film consisting of Al or an Al-based alloy or by a film obtained by stacking a metal film and a transparent conductive film such as an ITO film or the like.

Figure 12:
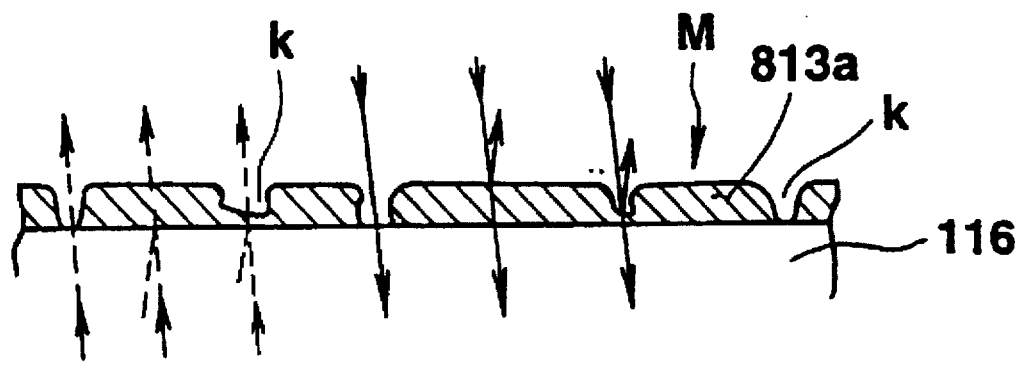
FIG. 12 is a longitudinal sectional view showing a semitransparent reflecting member according to the first example.
Figure 13:
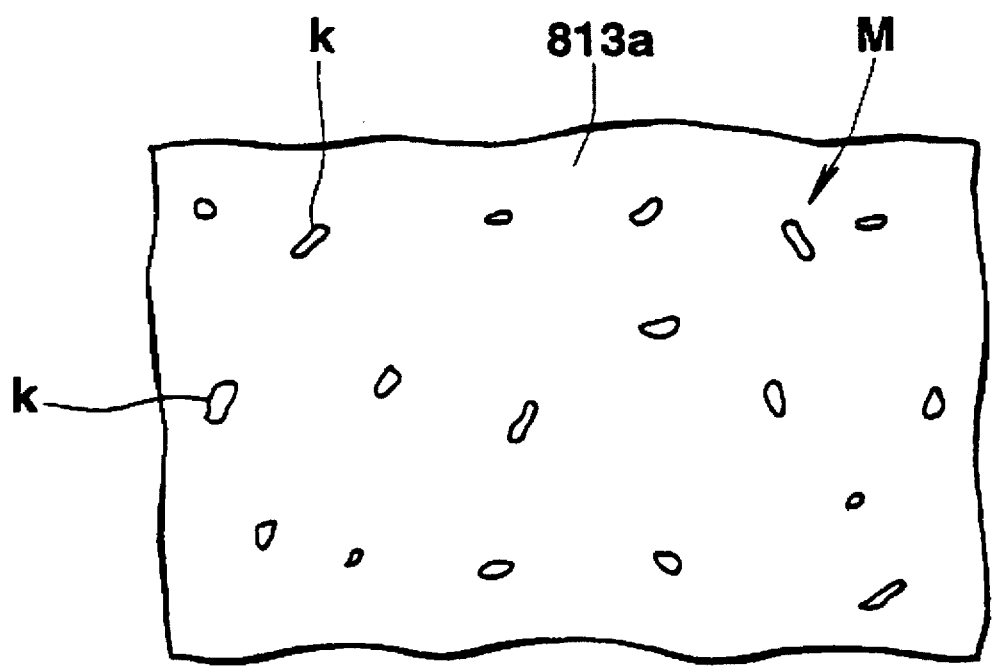
FIG. 13 is a plan view showing the semitransparent reflecting member shown in FIG. 12.

FIGS. 12 and 13 are sectional and plan views respectively showing part of a semitransparent reflecting film M according to the first example. This semitransparent reflecting film M is constituted by a metal thin film 813a having a very small thickness and formed by a sputtering apparatus.

More specifically, the semitransparent reflecting film M is formed by causing the sputtering apparatus to deposit metal particles to a very small thickness on an underlying surface (in this case, the gate insulating film 116). The semitransparent reflecting film M shown in FIGS. 12 and 13 is constituted by the metal thin film 813a in which very small defective portions k such as hole defects where no metal particles are deposited and recessed defects where the thicknesses of the deposited metal particles are small are localized. Note that the defective portions k have irregular shapes, and the sizes and distribution state of the defective portions k change in accordance with the thickness of the metal thin film 813a.

The semitransparent reflecting film M reflects and transmits light (indicated by solid arrows in FIG. 12) incident on the front surface side and light (indicated by broken arrows in FIG. 12) incident on the rear surface side at a certain reflectance and a certain transmittance. Part of light incident on the film portion (portion except for the defective portions k) of the metal thin film 813a is reflected by the film surface of the metal thin film 813a. A certain amount of light is transmitted through the metal thin film 813a, and the remaining light is absorbed by the metal thin film 813a.

Of the defective portions k of the metal thin film 813a, a recessed defective portion having metal particles deposited to a very small thickness has a metal thin film having a very small thickness. For this reason, an amount of light reflected and absorbed by the recessed defective portion is very small. Therefore, most of light incident on the recessed defective portion is transmitted through the recessed defective portion. The entire part of light incident on a hole defective portion where no metal particles are deposited becomes transmitted light.

The total area of the defective portions k per unit area of the metal thin film 813a is considerably smaller than the area of the film portion per unit area. Therefore, the transmittance of the semitransparent reflecting film M almost depends on the transmittance of the film portion of the metal thin film 813a.

The transmittance of the film portion of the metal thin film 813a depends on the optical constant and thickness of the metal serving as the material of the metal film. For this reason, when the thickness of the metal thin film 813a is selected, the semitransparent reflecting film M having a transmittance of 5 to 20% can be obtained.

The semitransparent reflecting film M shown in FIGS. 12 and 13 is constituted by the metal thin film 813a in which the small defective portions k such as hole and recessed defects are localized. However, the semitransparent reflecting film M may be a metal thin film in which the hole and recessed defects are rarely formed. In this case, when the metal thin film has a thickness of about 20 nm or less., this film can be used as the semitransparent reflecting film M.

More specifically, in formation of a metal thin film by a sputtering apparatus, when the thickness of the metal thin film is set to be 10 nm or less, a formed metal thin film having hole and recessed defects is obtained. As the film thickness increases to about 10 nm or more, the hole and recessed defects decrease in size accordingly, and the number of distributed hole and recessed defects decreases accordingly. When the film thickness becomes a certain thickness or more, most of the hole and recessed defects clog, thereby obtaining a film having an even surface.

For example, when the metal thin film consists of Al or a Ti (titanium) alloy, the metal thin film having a thickness of, e.g., 8.5 nm, is a film having small defective portions k as shown in FIGS. 12 and 13. The metal thin film has a transmittance of about 10 to 20% and a sheet resistance of 53 $\Omega/\square$.

A metal thin film obtained by forming an Al or Al-Ti alloy film having a thickness of 17.0 nm is a film, having an almost even surface, in which the hole and recessed defects are rarely formed. The metal thin film has a transmittance of about 5% and a sheet resistance of 14 $\Omega/\square$.

The transmittance of the semitransparent reflecting film M preferably falls within the range of 5 to 20%. However, in order to effectively use light from the light source 850, the transmittance is preferably set to be 6% or more, and more preferably set to be 7% or more.

However, in order to increase the transmittance of the semitransparent reflecting film M, the thickness of the metal thin film must be decreased to some extent. For this reason, the sheet resistance of the metal thin film increases. However, when the semitransparent reflecting film M is constituted by a film obtained by stacking a transparent conductive film such as an ITO film and a metal film having a high reflectance, the sheet resistance can be decreased.

Figure 14:
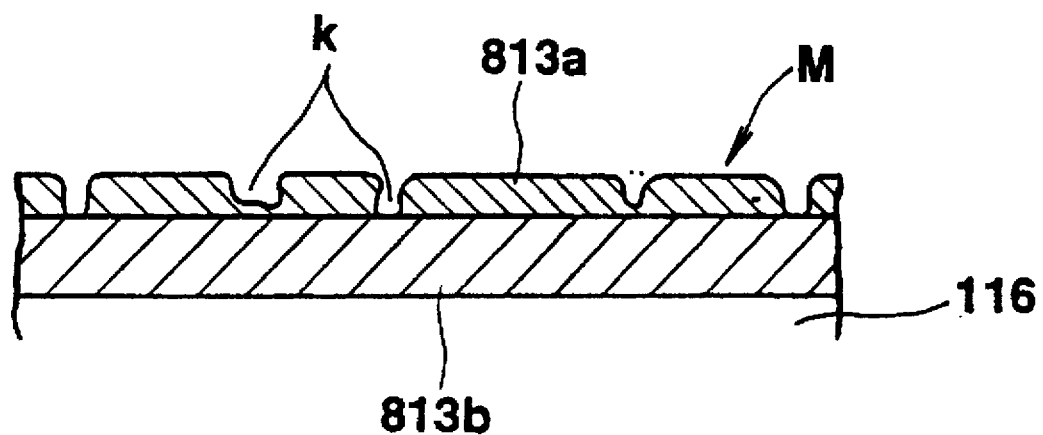
FIG. 14 is a longitudinal sectional view showing a semitransparent reflecting member according to the second example.
Figure 15:
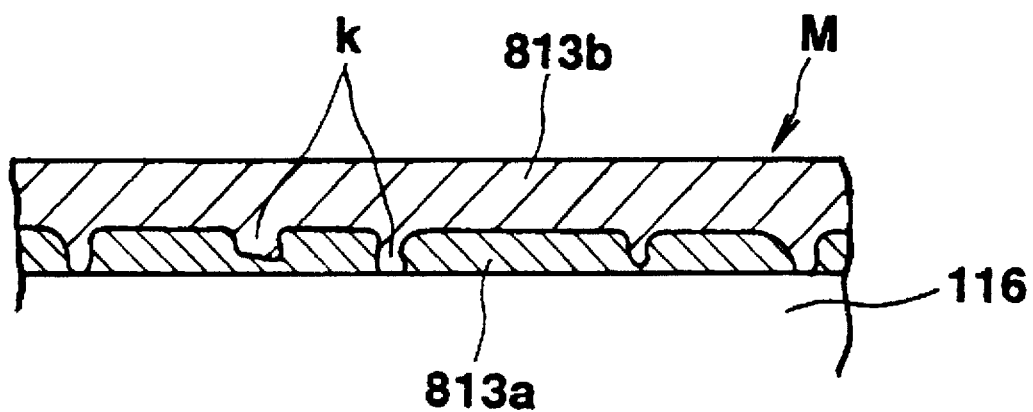
FIG. 15 is a longitudinal sectional view showing a semitransparent reflecting member according to the third example.

More specifically, FIGS. 14 and 15 are sectional views respectively showing parts of semitransparent reflecting films M according to the second and third examples. In the semitransparent reflecting film M shown in FIG. 14, an ITO film 813b is formed on the underlying surface (gate insulating film 116) of the semitransparent reflecting film M by a sputtering apparatus, and the metal thin film 813a shown in FIGS. 12 and 13 is formed on the ITO film 813b.

In the semitransparent reflecting film M shown in FIG. 15, the metal thin film 813a shown in FIGS. 12 and 13 is formed on the underlying surface (gate insulating film 116) of the semitransparent reflecting film M, and an ITO film 813b is formed on the metal thin film 813a by a sputtering apparatus.

The sheet resistance of the ITO film 813b of each of the semitransparent reflecting films M shown in FIGS. 14 and 15 is set to be 40 $\Omega/\square$ even when the thickness of the ITO film 813b is set to be 50 nm. Therefore, even when the metal thin film 813a has a certain high sheet resistance, the apparent sheet resistance of the semitransparent reflecting film M can be decreased.

The metal thin film 813a of each of the semitransparent reflecting films M shown in FIGS. 14 and 15 is a metal-thin film in which small defective portions k such as hole and recessed defects are localized. However, the metal thin film may be constituted by a metal thin film, having an almost even surface, in which the defective portions k are rarely formed.

Figure 16:
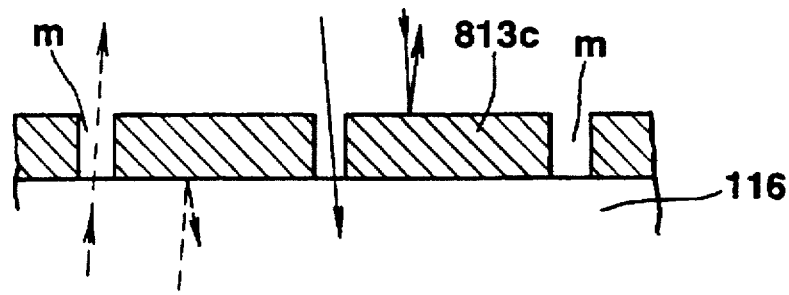
FIG. 16 is a longitudinal sectional view showing a semitransparent reflecting member according to the fourth example.
Figure 17:
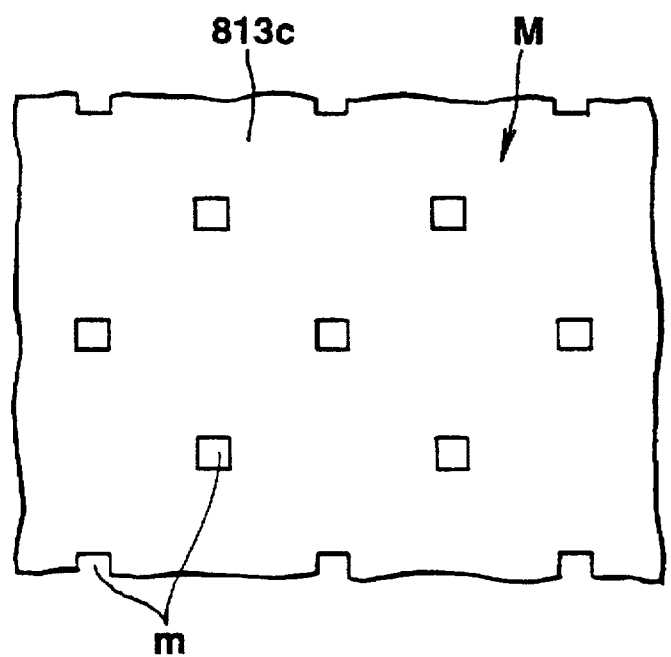
FIG. 17 is a plan view showing the semitransparent reflecting member shown in FIG. 16.

FIGS. 16 and 17 are sectional and plan views showing part of a semitransparent reflecting film M according to the fourth example. This semitransparent reflecting film M is constituted by an opaque metal film 813c in which small openings m are localized.

More specifically, the semitransparent reflecting film M is formed such that the metal film 813c consisting of Al, an Al alloy, or the like is formed on the underlying surface (gate insulating film 116) of the semitransparent reflecting film M by a sputtering apparatus to have a thickness (about 300 nm) at which the metal film 813c does not transmit light, and a large number of small openings m are formed in the opaque metal film 813c by a photography method.

The semitransparent reflecting film M causes its metal surface to reflect light incident on the film portion (portion except for the openings m) of the metal film 813c and transmits light incident on the opening m portions. Light indicated by solid arrows in FIG. 16 and incident on the front surface side-of the semitransparent reflecting film M and light indicated by broken arrows in FIG. 16 and incident on the rear surface side of the semitransparent reflecting film M are transmitted through and reflected by the semitransparent reflecting film M at a certain reflectance and a certain transmittance.

Since the semitransparent reflecting film M is constituted by the metal film 813c having a relatively large thickness at which the metal film 813c transmits light, the semitransparent reflecting film M advantageously has a low sheet resistance. In addition, the transmittance of the semitransparent reflecting film M depends on the total area of the openings m distributed in a unit area of the opaque metal film 813c.

However, in the semitransparent reflecting film M, when each opening m has a large area, the opening m portions seem to be black points when light is incident on the front surface side of the semitransparent reflecting film M to observe the reflected light, and the opening m portions seem to be bright points when light is incident on the rear surface side of the semitransparent reflecting film M to observe the transmitted light. For this reason, in order to prevent the black and bright points from being obvious, it is desired that intervals between openings m are set to be about 3 μm or less and that a desired transmittance is obtained in accordance with the number of openings m.

The pixel electrodes 813 are formed such that a selected one of the semitransparent reflecting films M according to the first to fourth examples is formed on the gate insulating film 116, and the selected semitransparent reflecting film M is patterned by a photography method. Note that, when pixel electrodes are to be formed by the semitransparent reflecting film M shown in FIGS. 15 and 16, formation of the openings m in the opaque metal film 813c and patterning for the pixel electrode 813 can be simultaneously performed. On the other hand, a transparent counter electrode 123 consisting of an ITO film or the like is formed on the inner surface, i.e., a surface, opposing the liquid crystal layer, of the first substrate 112 of the liquid crystal cell 810, and an aligning film 124 is formed on the counter electrode 123. Note that the counter electrode 123 is a sheet-like electrode opposing all the pixel electrodes of the second substrate 111.

The second substrate 111 joined with the first substrate 112 at their edge portions through a frame-like seal member (not shown), and the liquid crystal 125 is filmed in an area surrounded by the seal member between both the second substrates 111 and 112.

The liquid crystal 125 is a nematic liquid crystal having a positive dielectric anisotropy. The aligning directions of the molecules of the liquid crystal 125 are restricted on the substrates 111 and 112 by the aligning films 222 and 124 arranged on the substrates 111 and 112, respectively, and the molecules are twisted and aligned between both the substrates 111 and 112. Note that the aligning films 222 and 124 are horizontal aligning films consisting of polyimide or the like, and their surfaces are subjected to an aligning treatment by rubbing.

Figure 18:
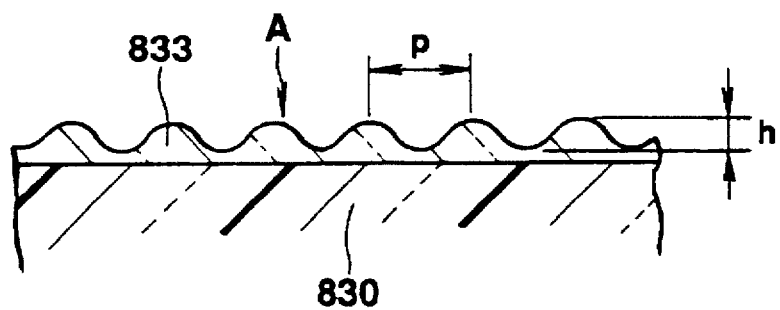
FIG. 18 is an enlarged longitudinal sectional view of the front surface of a front polarizing plate in the eighth embodiment.

Of the front and rear polarizing plates 830 and 832, the rear polarizing plate 832 is a general polarizing plate, and the front polarizing plate 830 is a polarizing plate having a light-scattering surface A as one surface, e.g., the front surface. The light-scattering surface A of the front polarizing plate 830 is constituted by forming a transparent film 833 having a fine corrugated surface on the front surface of the front polarizing plate 830 as shown in FIG. 18 as an enlarged sectional view showing part of the transparent film 833.

The transparent film 833 made of a resin such as an acrylic resin having a high transmittance. The transparent film 833 is formed by a method of transfer-printing a resin material on the front surface of the front polarizing plate 830 using a printing plate having a fine corrugated surface and setting the printed resin material, a method of coating the resin material having a uniform thickness on the front surface of the front polarizing plate 830, performing embossing to corrugate the front surface of the resin material film, and then setting the resin material film, or a method of coating, on the front surface of the front polarizing plate 830, the resin material containing transparent fine particles consisting of silica or the like and setting the coated resin material.

The transparent film 833 has an average height (difference between the levels of a recessed surface and a projecting surface) h of 1 to 5 μm and an average pitch p (between projecting portions) of 5 to 40 82 m, and the haze value of the light-scattering surface A is set to be 9 to 14%.

Note that the haze value is a measurement value obtained by an integrating sphere type light transmittance measuring apparatus (haze meter) according to JIS K 6714. This haze value is calculated by the following equations:

total light transmittance: Tt $(\%)=T2/T1$ parallel light transmittance: TP $(\%)=Tt-Td$ diffusion transmittance: Td $(\%)=[(T4-T3)\times(T2/T1)]/T1$ haze value: $H(\%)=(Td/Tt)\times 100$ where
- T1: an amount of incident light
- T2: an amount of total transmitted light
- T3: an amount of diffused light obtained by the measuring apparatus
- T4: an amount of diffused light obtained by a test sample (transparent film 833) and the measuring apparatus The retardation plate 831 consists of an uniaxially stretched film such as a polycarbonate film. The retardation plate 831 is arranged between the liquid crystal cell 810 and the front polarizing plate 830 arranged on the front surface side of the liquid crystal cell 810 such that the retardation axis (stretching axis) of the retardation plate 831 is shifted by a predetermined angle with respect to the transmission axis of the front polarizing plate 830.

Note that the retardation plate 831 is adhered to the front surface (the outer surface of the first substrate 112) of the liquid crystal cell 810, and the front polarizing plate 830 is adhered to the front surface of the retardation plate 831. The rear polarizing plate 832 is adhered to the rear surface (the outer surface of the second substrate 111) of the liquid crystal cell 810.

The light source 850 (FIG. 10) is identical to a light source used in a conventional liquid crystal display device, and is constituted by a light-guide plate 851 opposing the almost entire rear surface of the rear polarizing plate 832 and a light source lamp 852, arranged toward one end face of the light-guide plate 851, for emitting white light.

As shown in FIG. 11, the light-guide plate 851 is obtained such that a reflecting film 851a consisting of an Al-deposited film or the like is formed on the entire rear surface of a transparent plate consisting of an acrylic resin or the like. Illumination light from the light source lamp 852 is incident on one end face of the light-guide plate 851 and guided through the light-guide plate 851, and the light emerges from the entire front surface of the light-guide plate 851 toward the liquid crystal cell 810.

In the liquid crystal display device of the embodiment, the front polarizing plate 830 is arranged such that its transmission axis is obliquely shifted by a predetermined angle with respect to the aligning direction (the rubbing direction of the aligning film 124) of liquid crystal molecules on the first substrate 112 of the liquid crystal cell 810, the polarizing plate 831 is arranged such that its retardation axis (stretching axis) is obliquely shifted by a predetermined angle with respect to the transmission axis of the front polarizing plate 830, and the rear polarizing plate 832 is arranged such that its transmission axis is obliquely shifted by a predetermined angle with respect to the aligning direction (the rubbing direction of the aligning film 222) of liquid crystal molecules on the second substrate 111 of the liquid crystal cell 810.

In this embodiment, the liquid crystal molecule aligning direction on the second substrate 111 of the liquid crystal cell 810 is set to be a direction having an azimuth angle of 0°. With reference to this direction, the liquid crystal molecule aligning direction on the first substrate 112 of the liquid crystal cell 810, the directions of the transmission axes of the polarizing plates 830 and 832, and the direction of the retardation axis of the retardation plate 831 are set.

Figure 19A:
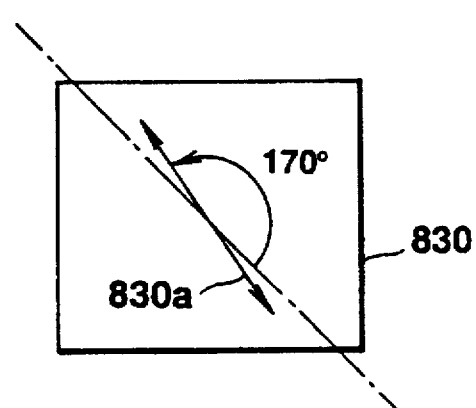
FIG. 19A is a plan view showing the relationship between a liquid crystal molecule aligning direction on the second substrate of a liquid crystal cell and the transmission axis of the front polarizing plate in the eighth embodiment.
Figure 19B:
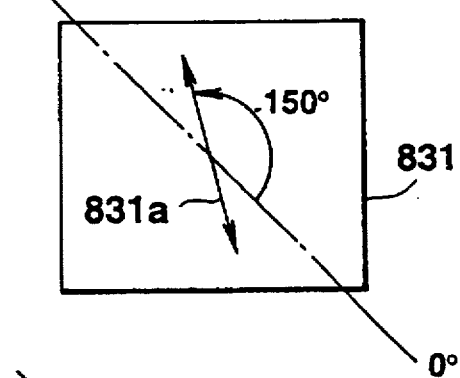
FIG. 19B is a plan view showing the relationship between the liquid crystal molecule aligning direction and the retardation axis of a retardation plate.
Figure 19C:
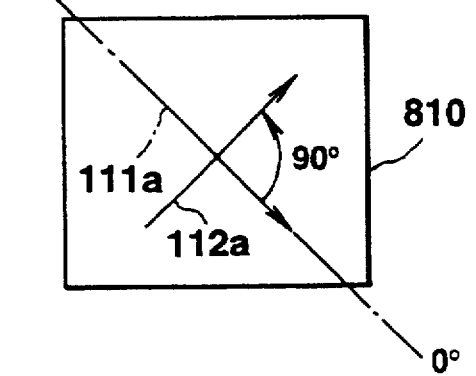
FIG. 19C is a plan view showing the relationship between the liquid crystal molecule aligning directions on the first and second substrates.

FIGS. 19A to 19D are plan views respectively showing the liquid crystal molecule aligning direction of the liquid crystal cell 810 in the liquid crystal display device, the retardation axis of the retardation plate 831, and the transmission axes of the polarizing plates 830 and 831. In FIG. 19C, reference numeral 111a denotes liquid crystal molecule aligning direction on the second substrate 111 of the liquid crystal cell 810, and reference numeral 112a denotes a liquid crystal molecule aligning direction on the first substrate 112 of the liquid crystal cell 810. As shown in FIG. 19C, the liquid crystal molecule aligning direction 112a on the first substrate 112 of the liquid crystal cell 810 is shifted counterclockwise by about 90° with respect to the liquid crystal molecule aligning direction 111a on the second substrate 111, i.e., a direction having an azimuth angle of 0° when viewed from the front surface side of the liquid crystal display device. The molecules of the liquid crystal 125 are twisted and aligned at a twist angle of about 90° between both-the substrates 111 and 112.

In FIGS. 19A and 19B, reference numeral 830a denotes a transmission axis of the polarizing plate 830; 831a, a retardation axis of the retardation plate 831. The transmission axis 830a of the polarizing plate 830 is shifted counterclockwise by about 170° with respect to the direction having the azimuth angle of 0° when viewed from the front surface side of the liquid crystal display device, and the retardation axis 831a of the retardation plate 831 is shifted counterclockwise by about 150° with respect to the direction having the azimuth angle of 0° when viewed from the front surface side of the liquid crystal display device. Therefore, the retardation axis 831a of the retardation plate 831 is obliquely shifted clockwise by about 20° with respect to the transmission axis 830a of the polarizing plate 830 when viewed from the front surface side of the liquid crystal display device.

Figure 19D:
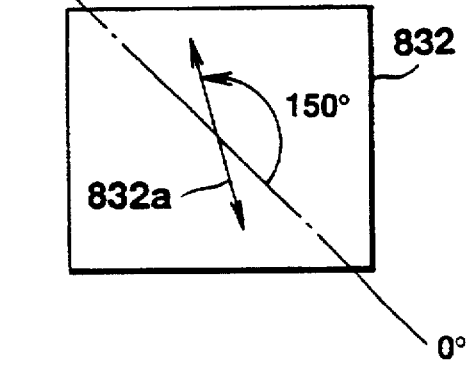
FIG. 19D is a plan view showing the liquid crystal molecule aligning direction on the second substrate and the transmission axis of a rear polarizing plate.

In FIG. 19D, reference numeral 832a denotes a transmission axis of the rear polarizing plate 832. The transmission axis 832a of the rear polarizing plate 832 has a direction shifted counterclockwise by about 150° with respect to the direction having the azimuth angle of 0° when viewed from the front surface side of the liquid crystal display device.

This liquid crystal display device performs a reflection display using external light (natural light or indoor illumination light) at a bright place where an amount of external light is sufficiently large. At this time, the external light incident on the front surface side of the liquid crystal display device, as indicated by the solid arrows in FIG. 10, is changed into linearly polarized light by the polarizing function of the front polarizing plate 830, and the linearly polarized light is incident on the liquid crystal cell 810. At the same time, light passing through the liquid crystal layer is incident on the semitransparent reflecting film M (pixel electrodes 813) arranged on the inner surface of the second substrate 111 of the liquid crystal cell 810, and light reflected by the semitransparent reflecting film M passes through the liquid crystal layer again and is incident on the front polarizing plate 830. Light transmitted through the front polarizing plate 830 emerges from the front surface side of the liquid crystal display device as image light.

The liquid crystal display device can perform a display using light from the light source 850 even at a dark place where an amount of external light is small. In this case, the light from the light source 850, as indicated by the broken arrows in FIG. 10, is changed into linearly polarized light by the polarizing function of the rear polarizing plate 832, and the linearly polarized light is incident on the liquid crystal cell 810. Light transmitted through the semitransparent reflecting film M (pixel electrodes 813) formed on the inner surface of the second substrate 111 passes through the liquid crystal layer and incident on the front polarizing plate 830, and light transmitted through the front polarizing plate 830 emerges from the front surface side of the liquid crystal display device as image light.

More specifically, in the liquid crystal display device, the semitransparent reflecting film M is arranged on the inner surface of the second substrate 111 of the liquid crystal cell 810. Therefore, in a reflection display using external light, the liquid crystal display device has a polarizing function in which light incident on the front polarizing plate 830 arranged on the front surface side of the liquid crystal cell 810 is changed into linearly polarized light and an analyzing function in which light passing through the liquid crystal layer of the liquid crystal cell 810 is changed into image light, and performs a display without using the rear polarizing plate 832 arranged on the rear surface side of the liquid crystal cell 810. In a transmission display using light from the light source 850, the liquid crystal display device respectively uses the rear polarizing plate 832 and the front polarizing plate 830 respectively as a polarizer and an analyzer to perform a display.

The display operation of the liquid crystal display device will be described below with reference to the reflection display using external light. In the liquid crystal display device, the retardation axis 831a of the retardation plate 831 is obliquely shifted with respect to the transmission axis 830a of the front polarizing plate 830. For this reason, while linearly polarized light incident on the liquid crystal display device through the front polarizing plate 830 passes through the retardation plate 831, the linearly polarized light is changed into elliptically polarized light whose polarized state is changed every wavelength by the birefringence effect of the retardation plate 831. While the elliptically polarized light passes through the liquid crystal layer of the liquid crystal cell 810, the polarized state of the elliptically polarized light is changed by the birefringence effect of the liquid crystal layer, and this light is incident on the semitransparent reflecting film M arranged on the inner surface side of the second substrate 111 of the liquid crystal cell 810. While, of the incident light, light reflected by the semitransparent reflecting film M passes through the liquid crystal layer and the retardation plate 831, the polarized state of the reflected light is changed by the birefringence effects of the liquid crystal layer and the retardation plate 831, and this light is incident on the front polarizing plate 830.

The reflected light incident on the front polarizing plate 830 is nonlinearly polarized light whose polarized state has been changed by the birefringence effects of the retardation plate 831 and the liquid crystal layer of the liquid crystal cell 810. For this reason, of the nonlinearly polarized light, wavelength light components transmitted through the front polarizing plate 830 are transmitted through the polarizing plate 830 and emerge, and colored light corresponding to the ratio of the wavelength light components of the exit light is obtained.

A display using light from the light source 850 will be described below. The light from the light source 850 is changed into linearly polarized light through the rear polarizing plate 832, and the linearly polarized light is incident on the front surface side of the liquid crystal cell 810. Of the incident light, light transmitted through the semitransparent reflecting film M arranged on the inner surface side of the second substrate 111 of the liquid crystal cell 810 passes through the liquid crystal layer. In the liquid crystal display device, however, the transmission axis 832a of the rear polarizing plate 832 is obliquely shifted with respect to the liquid crystal molecule aligning direction 111a on the second substrate 111 of the liquid crystal cell 810. For this reason, while the linearly polarized light incident on the rear surface side of the liquid crystal cell 810 passes through the liquid crystal layer of the liquid crystal cell 810, the linearly polarized light is changed into elliptically polarized light whose polarized state is changed every wavelength by the birefringence effect of the liquid crystal layer. While the elliptically polarized light passes through the retardation plate 831, the polarized state of the elliptically polarized light is changed by the birefringence effect of the retardation plate 831, and this light is incident on the front polarizing plate 830.

In this case, the light incident on the front polarizing plate 830 is nonlinearly polarized light whose polarized state has been changed by the birefringence effects of the retardation plate 831 and the liquid crystal layer of the liquid crystal cell 810. For this reason, of the nonlinearly polarized light, wavelength light components transmitted through the polarizing plate 830 are transmitted through the front polarizing plate 830 and emerges, and colored light corresponding to the ratio of the wavelength light components of the exit light is obtained.

More specifically, in a reflection display using external light, the liquid crystal display device colors light using the birefringence effects of the retardation plate 831 and the liquid crystal layer of the liquid crystal cell 810-and the polarizing and analyzing functions of the front polarizing plate 830. In a transmission display using light from the light source 850, the liquid crystal display device colors light using the birefringence effects of the retardation plate 831 and the liquid crystal layer of the liquid crystal cell 810 and the polarizing function of the rear polarizing plate 832 and the analyzing function of the front polarizing plate 830. According to the liquid crystal display device, colored light considerably brighter than that obtained in a liquid crystal display device using a general color filter can be obtained.

Since the liquid crystal display device of the embodiment colors light without using a color filter, light absorption caused by a color filter can be prevented, and the retardation plate 831 and the liquid crystal 125 of the liquid crystal cell 810 only change the polarized state of the transmitted light and rarely absorb light.

Therefore, the light amount of colored light having a polarized state changed by these birefringence effects and emerging through the front polarizing plate 830 is almost equal to the light amount of light in the wavelength band of the colored light of light incident through the front polarizing plate 830 and reflected by the semitransparent reflecting film M in a reflection display, or to the light amount of light in the wavelength band of the colored light of light incident through the rear polarizing plate 832 and transmitted through the semitransparent reflecting film M in the reflection display. For this reason, colored light having a high luminance can be obtained.

In the liquid crystal display device of the embodiment, the birefringence effect of the retardation plate 831 does not change, but the birefringence effect of the liquid crystal layer of the liquid crystal cell 810 changes depending on a change in aligned state of the liquid crystal molecules by a voltage applied across the electrodes 813 and 123 of both the substrates 111 and 112. For this reason, when a voltage applied to the liquid crystal cell 810 is controlled to change the polarized state of light passing through the retardation plate 831 and the liquid crystal layer of the liquid crystal cell 810, the color of colored light emerging through the front polarizing plate 830 can be changed. Therefore, a plurality of colors can be displayed by one pixel.

The display drive of the liquid crystal display device is performed as in the first embodiment.

The display colors of the liquid crystal display device will be described below. For example, as described above, the liquid crystal cell 810 is obtained by twisting and aligning liquid crystal molecules at a twist angle of 90° between both the substrates 111 and 112. Assume that the liquid crystal molecule aligning directions 111a and 112a on the second substrates 111 and 112, the directions of the transmission axes 830a and 832a of the polarizing plates 830 and 832, and the direction of the retardation axis 831a of the retardation plate 831 are respectively set as shown in FIGS. 19A to 19D, that a value Δn·d (the product of a refractive index anisotropy Δn of the liquid crystal 125 and a thickness d of the liquid crystal layer) of the liquid crystal cell 810 is set to be about 980 nm (e.g., Δn=0.204 and d=4.8 μm), and the retardation value of the retardation plate 831 is set to be, e.g., about 370 nm. In this case, in a reflection display using external light, the display color of each pixel is changed into red, blue, green, black, or white in accordance with the voltage applied to the liquid crystal cell 810. In a transmission display using light from the light source 850, the display color of each pixel is changed into red, green, blue, or white in accordance with the voltage applied to the liquid crystal cell 810.

Figure 20:
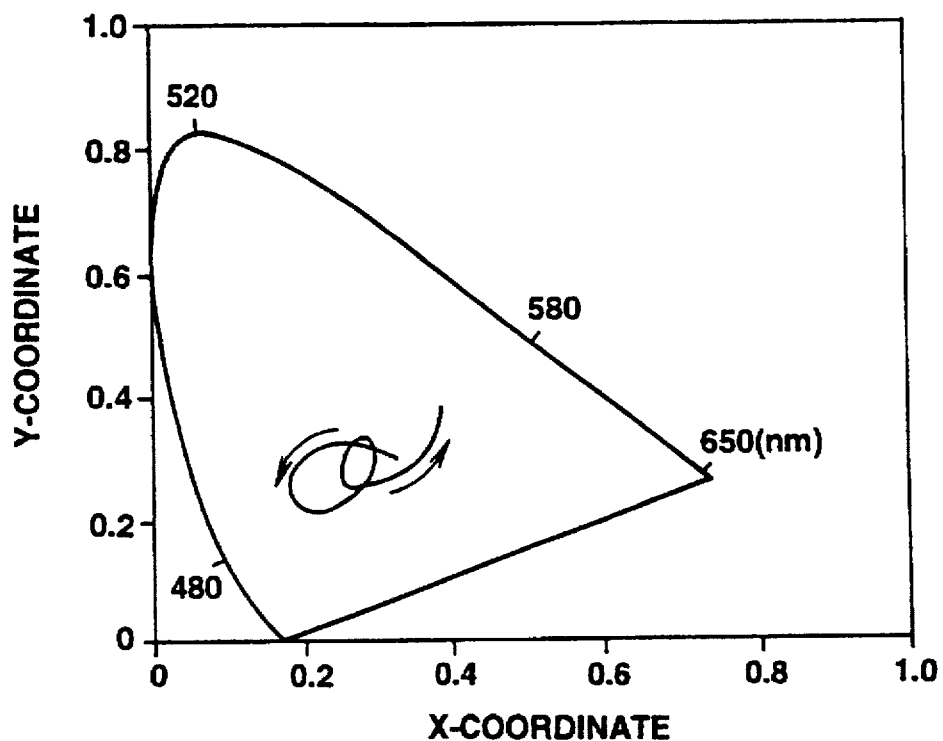
FIG. 20 is a CIE diagram showing a change in color with respect to an applied voltage in a reflection display of the eighth embodiment.
Figure 21:
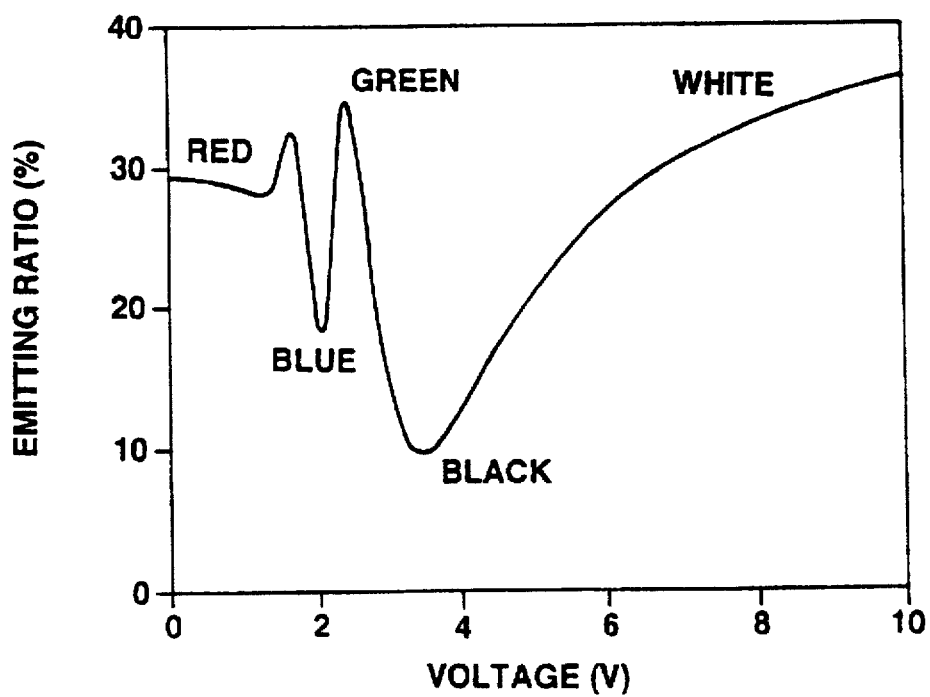
FIG. 21 is a graph showing voltage-emitting ratio characteristics in a reflection display.

FIGS. 20 and 21 show a change in display color in the reflection display of the liquid crystal display device. FIG. 20 is a CIE diagram showing a change in color of exit light with respect to a voltage applied to the liquid crystal display device, and FIG. 21 is a graph showing voltage-emitting ratio characteristics. Note that, in this case, FIGS. 20 and 21 show a result obtained such that white light is incident on the livid crystal display device from a direction (the azimuth may be arbitrarily set) having 30° with respect to the normal of the liquid crystal display device and light emerging from the liquid crystal display device is observed from the normal direction of the liquid crystal display device.

In this reflection display, as the voltage applied across the electrodes 813 and 123 of the liquid crystal cell 810 is increased, the color of the exit light changes as indicated by arrows in FIG. 20. While the color changes, as shown in FIG. 21, the color of the exit light is changed into a color of red, blue, green, black, or white having a high light intensity and a high color purity. Note that, in this case, the exit light of red is purplish red light.

In this manner, in the reflection display using external light, the liquid crystal display device allows one pixel to display the color of red, blue, green, black, and white. In addition, when different colors are respectively displayed by a plurality of adjacent pixels, a color of a neutral tint obtained by mixing a plurality of colors selected from red, blue, green, black, and white can be displayed.

Figure 22:
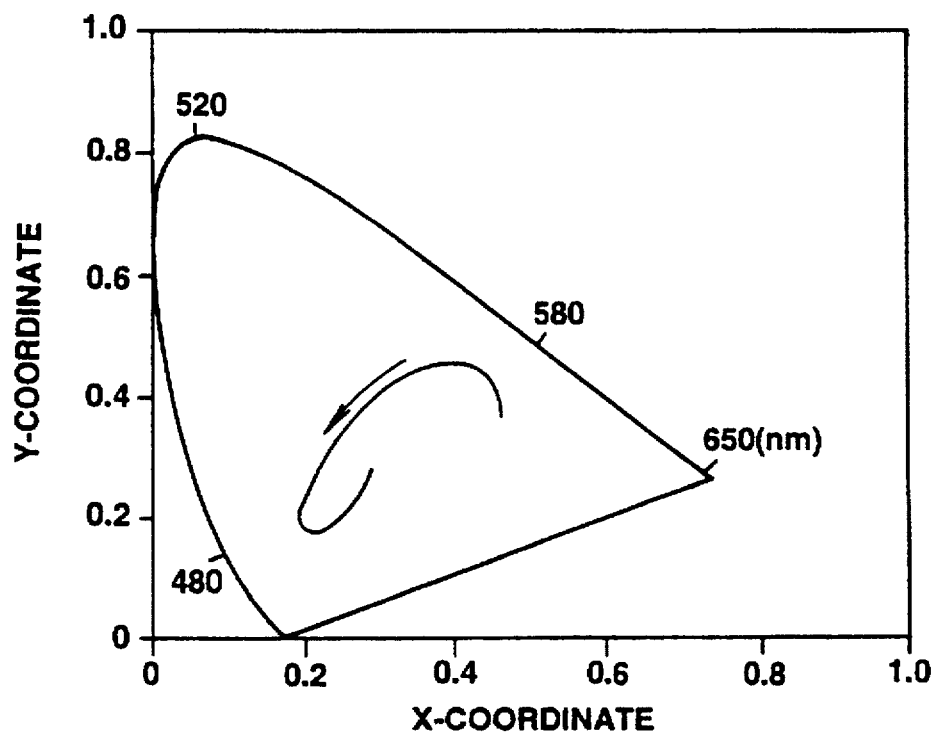
FIG. 22 is a CIE diagram showing a change in color of exit light with respect to an applied voltage in a transmission display.
Figure 23:
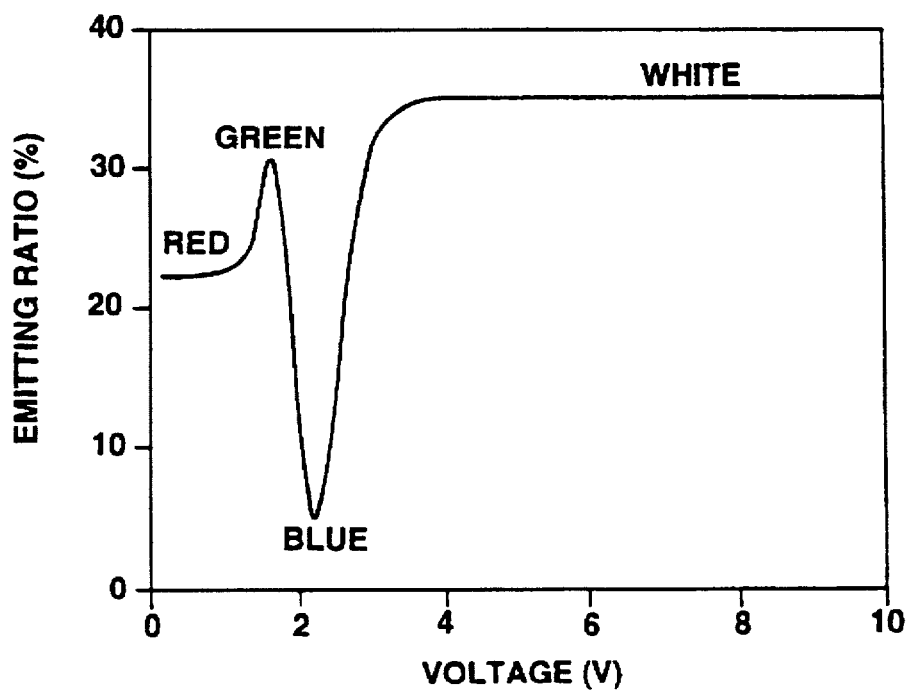
FIG. 23 is a graph showing voltage-emitting ratio characteristics in a transmission display.

FIGS. 22 and 23 show a change in display color in the transmission display of the liquid crystal display device. FIG. 22 is a CIE diagram showing a change in color of exit light with respect to a voltage applied to the liquid crystal display device, and FIG. 23 is a graph showing voltage-emitting ratio characteristics. Note that FIGS. 22 and 23 show a result obtained such that white light is incident on the liquid crystal display device from a direction (the azimuth may be arbitrarily set) having 30° with respect to the normal of the liquid crystal display device and light emerging from the liquid crystal display device is observed from the normal direction of the liquid crystal display device.

In this transmission display, as the voltage applied across the electrodes 813 and 123 of the liquid crystal cell 810 is increased, the color of the exit light changes as indicated by an arrow in FIG. 22. While the color changes, as shown in FIG. 23, the color of the exit light is changed into a color of red, green, blue, or white having a high light intensity and a high color purity.

In this manner, in the transmission display using light from the light source 850, the liquid crystal display device allows one pixel to display the color of red, green, blue, or white. In addition, when different colors are respectively displayed by a plurality of adjacent pixels, a color of a neutral tint obtained by mixing a plurality of colors selected from red, green, blue, and white can be displayed.

The display colors and the number of colors corresponding to the applied voltages in the reflection display are different from those in the transmission display. For this reason, when the liquid crystal cell 810 is driven even in the reflection display, as in the transmission display, a color image having colors different from those in the transmission display is displayed. However, when the drive conditions (the potential of a data signal corresponding to image data and the like) of the liquid crystal cell 810 are controlled in the reflection display, a color image having colors similar to those in the transmission display can be displayed in the reflection display.

However, the liquid crystal display device is usually used as a reflection display device using external light, and the liquid crystal display device is used as a transmission display device in which the light source 850 is turned on when display information is to be temporarily watched at a dark place where an amount of external light is small. For this reason, the difference between the display colors in the reflection display and the display colors in the transmission display rarely poses a problem. Therefore, the drive conditions of the liquid crystal cell 810 may be designed with reference to the drive conditions in the transmission display, and the liquid crystal cell 810 may be driven in the reflection display under the same conditions as those in the transmission display.

In the liquid crystal display device of the embodiment, red, blue, green, black, and white can be displayed in the reflection display, and red, green, blue, and white are displayed in the transmission display. The display colors of the liquid crystal display device are determined depending on voltages applied to the liquid crystal display device, the liquid crystal molecule aligning directions 111a and 112a on the substrates 111 and 112 of the liquid crystal cell 810, the twist angle of the liquid crystal molecules, the directions of the transmission axes 830a and 832a of the polarizing plates 830 and 832, and the direction of the retardation axis 831a of the retardation plate 831. For this reason, these conditions are properly selected to arbitrarily select a desired display color.

In the liquid crystal display device, the semitransparent reflecting film M is arranged on the inner surface side of the second substrate 111 of the livid crystal cell 810. In the reflection display using external light, the liquid crystal display device has both the functions, i.e., a polarizing function of changing light incident on the front polarizing plate 830 into linearly polarized light and an analyzing function of changing light passing through the liquid crystal layer of the liquid crystal cell 810 into image light, and performs a display without using the rear polarizing plate 832. For this reason, the reflection display can be performed without any exit light amount loss caused by the rear polarizing plate 832 and the second substrate 111 of the liquid crystal cell 810. Therefore, the light amount loss owing to light absorption of the polarizing plates and the substrates of the liquid crystal cell in the reflection display using external light can be reduced, and a display can be made sufficiently bright in the reflection display.

In the liquid crystal display device, although light also passes through the retardation plate 831 and the liquid crystal layer of the liquid crystal cell 810, a light amount loss caused by the retardation plate 831 and the liquid crystal layer is almost zero because the retardation plate 831 and the liquid crystal layer rarely absorb light.

In the liquid crystal display device, since the semitransparent reflecting film M is arranged on the inner surface side of the second substrate 111 of the liquid crystal cell 810, it is hard to use the semitransparent reflecting film M as a diffusion-reflecting film. However, as described above, when one surface of the front polarizing plate 830 arranged on the front surface side of the liquid crystal cell 810 is the light-scattering surface A, light incident on the liquid crystal display device and exit light can be scattered by the light-scattering surface A. For this reason, even when the reflecting surface of the semitransparent reflecting film M is nearly a mirror surface, an external image such as the face of a display operator or his background does not seem to appear on the reflecting surface.

In addition, in the liquid crystal display device, when the front surface of the pixel electrode 813 also serving as the semitransparent reflecting film M is nearly a mirror surface, light having the polarized state changed by the liquid crystal layer of the liquid crystal cell 810 in the reflection display is not scattered by the semitransparent reflecting film M. In the transmission display, light passing through the rear polarizing plate 832 and incident on the rear surface side of the liquid crystal cell 810 is not scattered by the semitransparent reflecting film M.

In this case, when the front surface of the front polarizing plate 830 is the light-scattering surface A, light incident on the front surface side of the liquid crystal display device in the reflection display is scattered and then changed into linearly polarized light by the polarizing function of the front polarizing plate 830. In the transmission display, since light passing through the liquid crystal layer of the liquid crystal cell 810 is changed into image light by the analyzing function of the front polarizing plate 830 and then scattered, the light is not scattered until the incident light passes through the front polarizing plate 830 to be changed into the image light, and, therefore, a high-quality image can be displayed.

The scattering effect of the light-scattering surface A is determined depending on the above haze value. When the haze value is 25% or more, the image light obtained by the analyzing function of the front polarizing plate 830 is considerably scattered to make a display image blurred. When the haze value is 6% or less, the external image appears on the light-scattering surface A. However, when the haze value of the light-scattering surface A falls within the range of 9 to 14%, a clear display image can be obtained, and the external image can be prevented from appearing on the light-scattering surface A.

In the liquid crystal display device, the pixel electrodes 813 arranged on the inner surface side of the second substrate 111 of the liquid crystal cell 810 also serve as the semitransparent reflecting film M. For this reason, although the semitransparent reflecting film is arranged on the inner surface side of the second substrate 111 of the liquid crystal cell 810, the structure of the liquid crystal cell 810 can be simplified, and the pixel electrodes 813 and the semitransparent reflecting film M can be simultaneously formed. Therefore, the liquid crystal cell 810 can be easily manufactured.

In the eighth embodiment, although the pixel electrodes 813 also serving as the semitransparent reflecting film M are formed not to overlap the TFTs 814, the pixel electrodes 813 may be formed to cover the TFTs 814.

Figure 24:
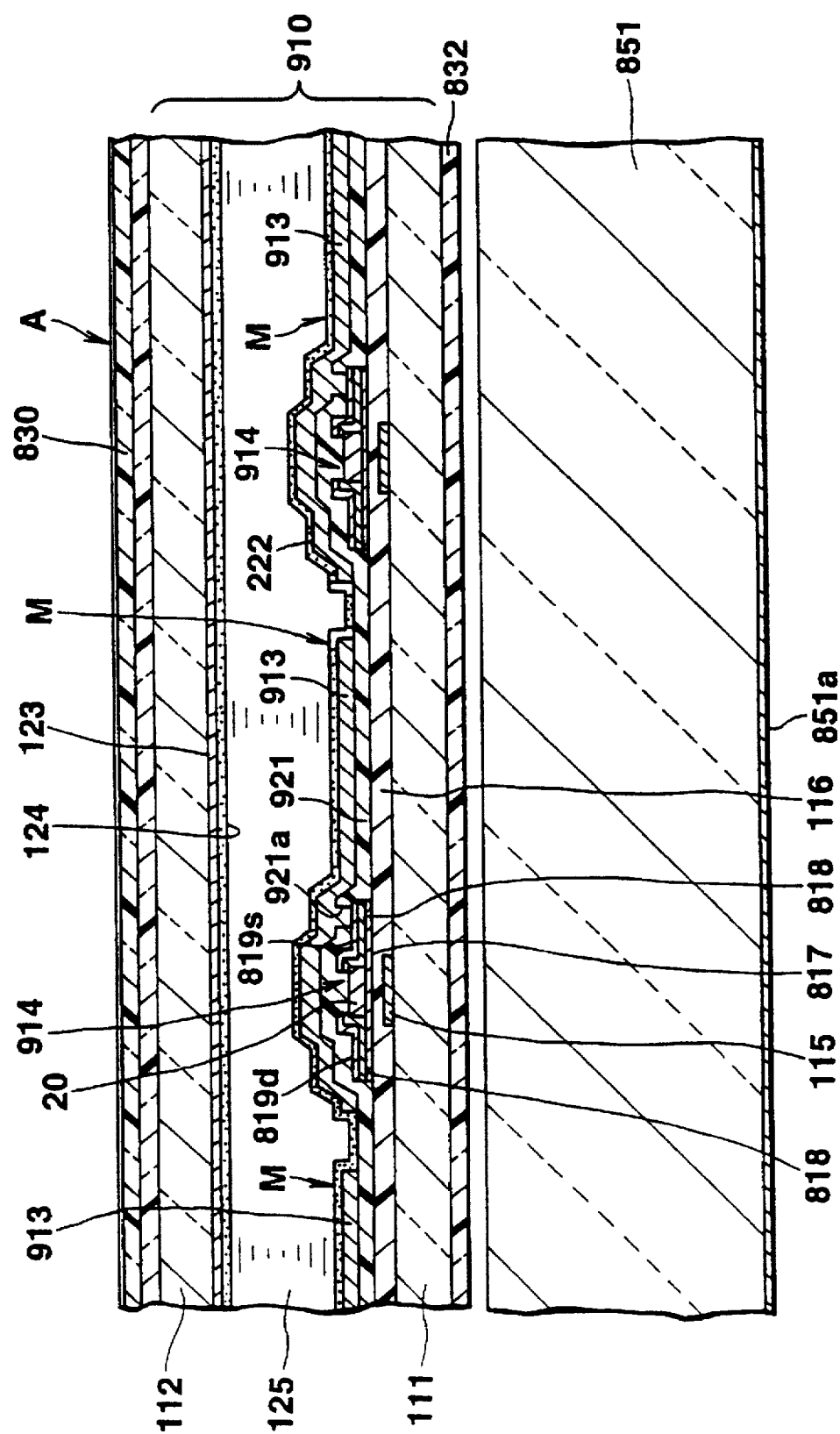
FIG. 24 is an enlarged longitudinal sectional view of part of a color liquid crystal display device according to the ninth embodiment of the present invention.

FIG. 24 is a sectional view of part of a liquid crystal display device showing the ninth embodiment of the present invention. In the liquid crystal display device of this embodiment, a protective insulating film 921 covering TFTs 914 arranged on the inner surface side of a second substrate 111 of a liquid crystal cell 910 is used as a transparent insulating film such as an SiN film, and the protective insulating film 921 is formed over the almost entire surface of the second substrate 111. Pixel electrodes 913 also serving as an semitransparent reflecting film M are formed on the protective insulating film 921 to partially cover the TFTs 914, and the pixel electrodes 913 are connected to source electrodes 819s of the TFTs 914 through contact holes 921a formed in the protective insulating film 921.

The arrangement of this embodiment is the same as that of the eighth embodiment described above except for the formation states of the protective insulating film 921 and pixel electrodes 913 covering the TFTs 914. Therefore, the same reference numerals as in the eighth embodiment denote the same parts in the ninth embodiment, and a repetitive description will be omitted.

As in this embodiment, the TFTs 914 are covered with the protective insulating film 921, and the pixel electrodes 913 are formed on the protective insulating film 921 to cover the TFTs 914. In this case, the areas of the pixel electrodes 913 also serving as the semitransparent reflecting film M can be increased. Therefore, in addition to the effect obtained in the eighth embodiment, an opening ratio can be increased in a reflection display using external light.

In the liquid crystal display device according to this embodiment, since transmitted light is shielded by the TFT 914 portions in a transmission display using light from a light source 850, an opening ratio in the transmission display is almost equal to that of the eighth embodiment. However, since the liquid crystal display device is usually used as a reflection display device using external light, it is considerably effective that the opening ration in the reflection display can be increased.

In the eighth or ninth embodiment, the pixel electrodes 813 or 913 and the TFTs 814 or 914 are formed on the second substrate 111 of the liquid crystal cell 810 or 910. However, the liquid crystal cell 810 or 910 may be constituted by forming the pixel electrodes 913 or 913 and the TFTS 814 and 914 on the first substrate 112.

Figure 25:
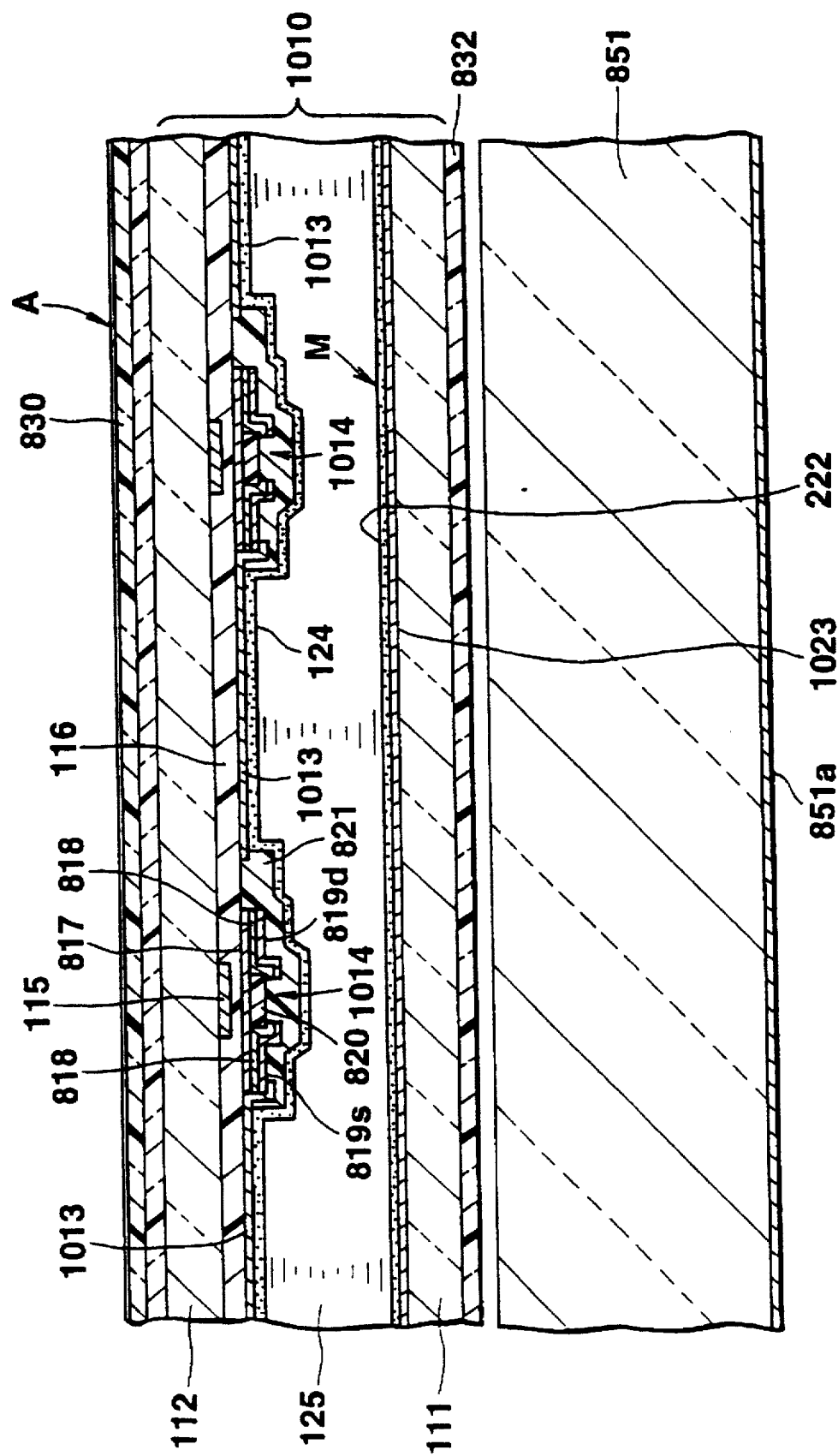
FIG. 25 is an enlarged longitudinal sectional view of part of a color liquid crystal display device according to the 10th embodiment of the present invention.

FIG. 25 is a sectional view of part of a liquid crystal display device showing the 10th embodiment of the present invention. According to this embodiment, an active matrix cell in which a plurality of pixel electrodes 1013 and a plurality of TFTs 1014 corresponding thereto are arranged on the inner surface side of a first substrate 112, and a counter electrode 1023 opposing the pixel electrodes 1013 is arranged on the inner surface side of a second substrate 111 is used as a liquid crystal cell 1010. The pixel electrodes 1013 are constituted by transparent electrodes consisting of an ITO film or the like, and the counter electrode 1023 is constituted by a selected one of the semitransparent reflecting films M shown in FIGS. 12 and 13, FIG. 14, FIG. 15, and FIGS. 16 and 17.

In the liquid crystal display device of this embodiment, the transparent pixel electrodes 1013 and the TFTs 1014 are arranged on the inner surface side of the first substrate 112 of the liquid crystal cell 1010, and the counter electrode 1023 also serving as the semitransparent reflecting film M is arranged on the inner surface side of the second substrate 111. The structure of each TFT 1014 is the same as that in the eighth embodiment, and the arrangements of polarizing plates 830 and 832 and a retardation plate 831 are the same as those of the eighth embodiment. Therefore, the same reference numerals as in the eighth embodiment denote the same parts in the 10th embodiment, and a repetitive description will be omitted.

According to the liquid crystal display device of this embodiment, as in the first embodiment described above, a bright color display can be obtained by coloring a display without using a color filter, and a plurality of desired colors can be displayed by one pixel. In addition, a light amount loss owing to light absorption of polarizing plates and the substrates of the liquid-crystal cell can be reduced in a reflection display using external light to make a display in a reflection display sufficiently bright, and the counter electrode 1023 arranged on the second substrate 111 of the liquid crystal cell 1010 also serves as the semitransparent reflecting film M. Therefore, the structure of the liquid crystal cell can be simplified, and the liquid crystal cell can be easily manufactured.

In the eighth to 10th embodiments, the electrodes (the pixel electrodes 813 and 913 in the eighth and ninth embodiments and the counter electrode 1023 in the 10th embodiment) arranged on the inner surface side of the second substrate 111 of the liquid crystal cell 1010 (810 or 910) also serve as the semitransparent reflecting film M. However, the electrodes arranged on the inner surface side of the second substrate 111 may be constituted by transparent electrodes consisting of an ITO film or the like, and a semitransparent reflecting film may be arranged on the rear surface side of the transparent electrodes through a transparent insulating film.

Figure 26:
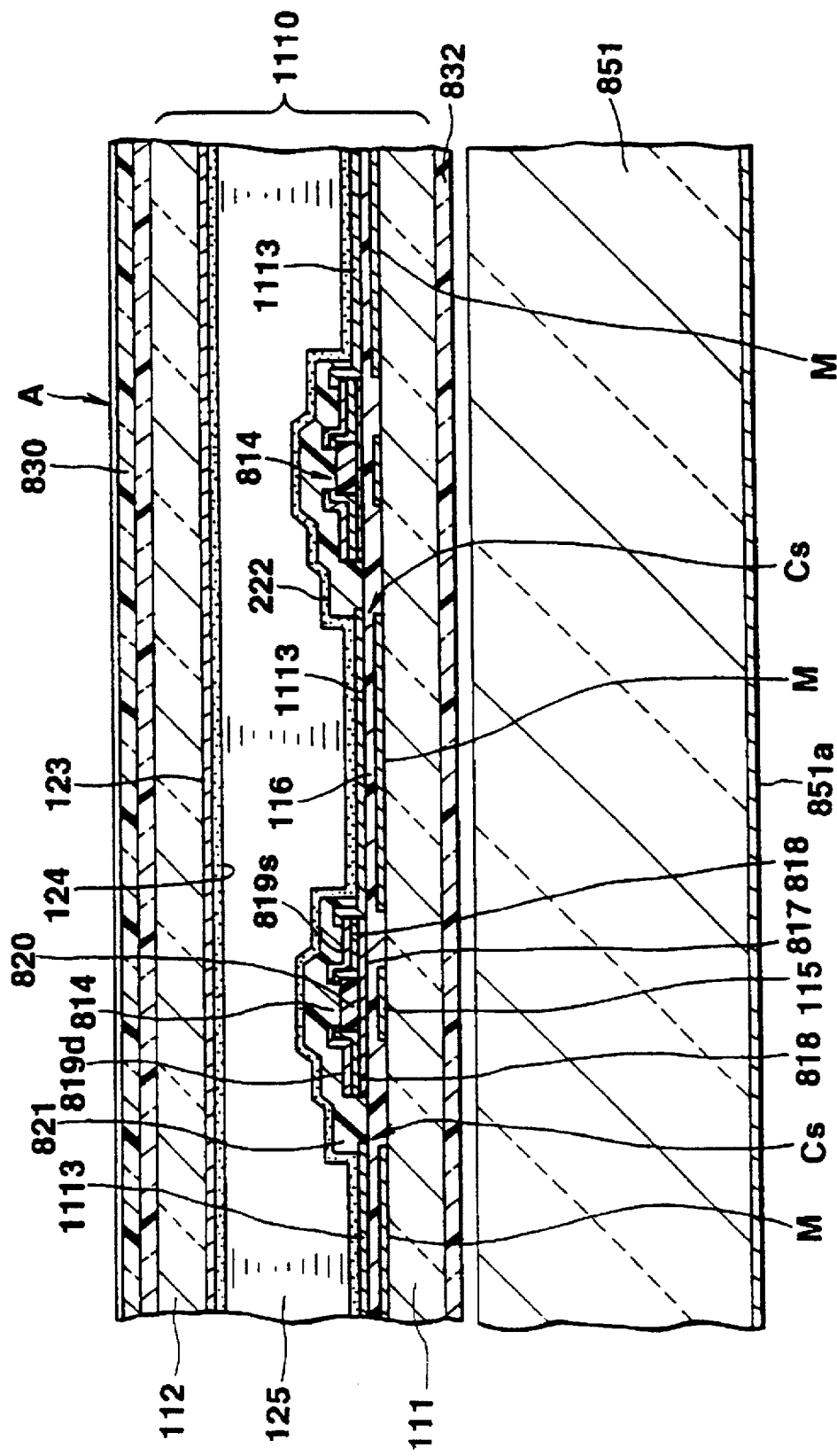
FIG. 26 is an enlarged longitudinal sectional view of part of a color liquid crystal display device according to the 11th embodiment of the present invention.

FIG. 26 is a sectional view of part of a liquid crystal display device showing the 11th embodiment of the present invention. According to this embodiment, an active matrix cell in which pixel electrodes 1113 and TFTs 814 are arranged on the inner surface side of a second substrate 111 and a counter electrode 123 is arranged on the inner surface side of a first substrate 112 is used as a liquid crystal cell 1110. The pixel electrodes 1113 and the counter electrode 123 are constituted by transparent electrodes consisting of an ITO film or the like, and a semitransparent reflecting film (one of the semitransparent reflecting films shown in FIGS. 12 and 13, FIG. 14, FIG. 15, and FIGS. 16 and 17) M is arranged through a gate insulating film (transparent film) 116 of the TFTs 814, on the rear surface side of the pixel electrodes 1113 arranged on the inner surface side of the second substrate 111.

The arrangement of the liquid crystal display device of this embodiment is the same as that of the eighth embodiment except that the pixel electrodes 1113 arranged on the inner surface side of the second substrate 111 of the liquid crystal cell 1110 are constituted by transparent electrodes, and the semitransparent reflecting film M is arranged on the rear surface side of the pixel electrodes 1113.

In this embodiment, the pixel electrodes 1113 formed on the inner surface side of the second substrate 111 of the liquid crystal cell 1110 are constituted by transparent electrodes, and the semitransparent reflecting film M is arranged on the rear surface side of the pixel electrodes 1113 through a transparent gate insulating film 116. For this reason, compensation capacitors Cs for compensating for the holding voltage of pixels in a non-selection state can be constituted by the semitransparent reflecting film M, the pixel electrodes 1113, and the gate insulating film therebetween.

When the compensation capacitors Cs are constituted by using the semitransparent reflecting film M as described above, a reference potential connection line is arranged on the second substrate 111 (although not shown, the reference potential connection line is arranged integrally with the semitransparent reflecting film M), and the semitransparent reflecting film M is connected to a reference potential through the reference potential connection line.

In the liquid crystal display device of each of the above embodiments, light is colored by using the birefringence effects of the retardation plate 831 and the liquid crystal layer of the liquid crystal cell and the polarizing and analyzing functions of the polarizing plates 830 and 832. However, the present invention can be applied to a birefringence effect color liquid crystal display device in which the retardation plate 831 is not arranged and light is colored by using the birefringence effect of the liquid crystal layer of the liquid crystal cell and the polarizing and analyzing functions of the front polarizing plates 830 and 832. In this case, when the transmission axis 830a of the front polarizing plate 830 is obliquely shifted with respect to the liquid crystal molecule aligning direction 112a on the first substrate 112 of the liquid crystal cell, and the transmission axis 832a of the rear polarizing plate 832 is obliquely shifted with respect to the aligning direction 111a on the second substrate 111 of the liquid crystal cell, light can be colored by using the birefringence effect of the liquid crystal layer of the liquid crystal cell and the polarizing and analyzing functions of the polarizing plates 830 and 832.

In the liquid crystal display device of each of the above embodiments, a color image is displayed by using a birefringence effect. However, the present invention can also be applied to a TN or STN liquid crystal display device.

Figure 27:
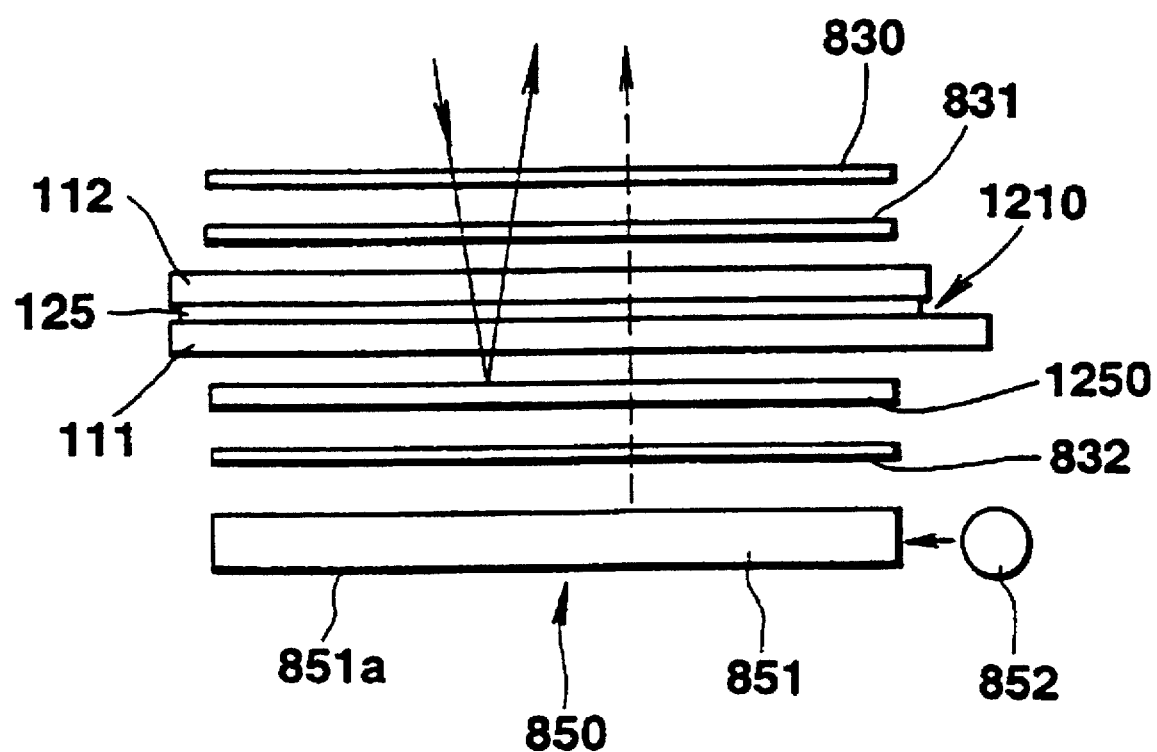
FIG. 27 is a view showing the basic arrangement of a color liquid crystal display device showing the 12th embodiment of the present invention.
Figure 28:
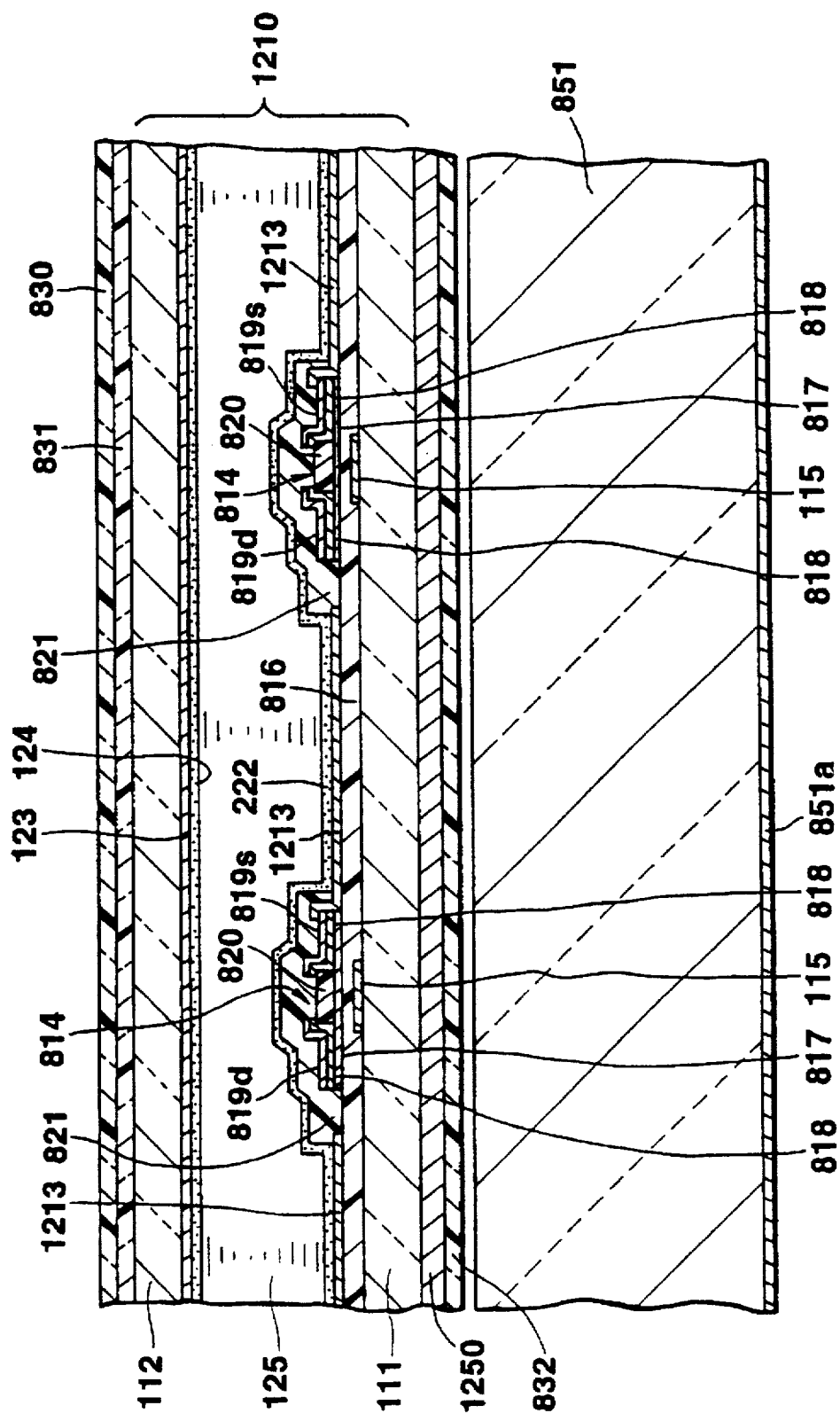
FIG. 28 is an enlarged longitudinal sectional view of the color liquid crystal display device according to the 12th embodiment.

FIG. 27 is a view of the basic arrangement of a liquid crystal display device showing the 12th embodiment, and FIG. 28 is an enlarged sectional view of part of the liquid crystal display device in FIG. 27.

The liquid crystal display device of this embodiment uses a birefringence effect to display a color image and has the following arrangement. That is, a first polarizing plate (to be referred to as an front polarizing plate hereinafter) 830 is arranged on the front surface side of a liquid crystal cell 1210, and a half mirror 1250 is arranged on the rear surface side of the liquid crystal cell 1210. In addition, a second polarizing plate (to be referred to as a rear polarizing plate hereinafter) 832 is arranged on the rear surface side of the liquid crystal cell 1210, and a retardation plate 831 is arranged between the liquid crystal cell 1210 and the front polarizing plate 830. As in the eighth embodiment, the light source 850 is arranged behind the rear polarizing plate 832.

The liquid crystal cell 1210 is an active matrix cell and has the same arrangement as that in the eighth embodiment except for the arrangement of pixel electrodes.

Pixel electrodes 1213 consist of an ITO film or the like. Each pixel electrode 1213 is formed on a gate insulating film 816 and has one end portion connected to a source electrode 819s of a corresponding one of TFTs 814.

The retardation plate 831 is a uniaxially stretched film consisting of polycarbonate or the like, the retardation plate 831 is adhered to the front surface (the outer surface of a first substrate 112) of the liquid crystal cell 1210, and the front polarizing plate 830 is adhered to the front surface of the retardation plate 831.

The half mirror 1250, like a commercially available half mirror, reflects and transmits incident light at a certain reflectance and a certain transmittance, respectively. In this embodiment, a half mirror having a transmittance of 5% or more (preferably 6 to 7%) and a reflectance of 14% or more is used. The front surface of the half mirror 1250 is a light-scattering surface subjected to a toughening process. The half mirror 1250 is adhered to the rear surface (the outer surface of a second substrate 111) of the liquid crystal cell 1210, and the rear polarizing plate 832 is adhered to the rear surface of the half mirror 1250.

As the light source 850, a light source identical to the light source in the eighth embodiment is used.

In the liquid crystal display device of this embodiment, the direction of the transparent axis of the front polarizing plate 830, liquid crystal molecule aligning directions (rubbing directions of aligning films 124 and 222), the direction of the retardation axis (stretching axis) of the retardation plate 831, the direction of the transmission axis of the rear polarizing plate 832 are set as in the eighth embodiment, i.e., as shown in FIGS. 19A to 19D.

This liquid crystal display device performs a reflection display using external light at a bright place where an amount of external light (natural light or indoor illumination light) is sufficiently large. At this time, the external light incident on the front surface side of the liquid crystal display device, as indicated by a solid arrow in FIG. 27, is changed into linearly polarized light by the polarizing function of the front polarizing plate 830, and the linearly polarized light is incident on the liquid crystal cell 1210. At the same time, light passing through the liquid crystal cell 1210 is incident on the half mirror 1250 arranged on the rear surface side of the liquid crystal cell 1210, and light reflected by the half mirror 1250 passes through the liquid crystal cell 1210 again and is incident on the front polarizing plate 830. Eight transmitted through the front polarizing plate 830 emerges from the front surface side of the liquid crystal display device as image light.

The liquid crystal display device can perform a display using light from the light source 850 even at a dark place where an amount of external light is small. In this case, the light from the light source 850, as indicated by a broken arrow in FIG. 27, is changed into linearly polarized light by the polarizing function of the rear polarizing plate 832 arranged on the rear surface side of the half mirror 1250, and light transmitted through the half mirror 1250 is incident on the liquid crystal cell 1210. Light passing through the liquid crystal cell 1210 is incident on the front polarizing plate 830, and light transmitted through the front polarizing plate 830 emerges from the front surface side of the liquid crystal display device as image light.

More specifically, in the liquid crystal display device, the front polarizing plate 830 is arranged on the front surface side of the liquid crystal cell 1210, and the half mirror 1250 is arranged on the rear surface side of the liquid crystal cell 1210. The rear polarizing plate 832 is arranged on the rear surface side of the half mirror 1250. Therefore, in a reflection display using external light, the liquid crystal display device has a polarizing function in which light incident on the front polarizing plate 830 is changed into linearly polarized light and an analyzing function in which light passing through the liquid crystal layer of the liquid crystal cell 1210 is changed into image light, and performs a display without using the rear polarizing plate 832. In a transmission display using light from the light source 850, the liquid crystal display device uses the rear polarizing plate 832 and the front polarizing plate 830 respectively as a polarizer and an analyzer to perform a display.

The display operation of the liquid crystal display device will be described below with respect to the reflection display using external light. In the liquid crystal display device, a retardation axis 831a of the retardation plate 831 is obliquely shifted with respect to a transmission axis 830a of the front polarizing plate 830. For this reason, while linearly polarized light incident on the liquid crystal display device through the front polarizing plate 830 passes through the retardation plate 831, the polarized state of the linearly polarized light is changed by the birefringence effect of the retardation plate 831 to obtain elliptically polarized light. While the elliptically polarized light passes through the liquid crystal layer of the liquid crystal cell 1210, the polarized state of the elliptically polarized light is changed by the birefringence effect of the liquid crystal layer, and this light emerges from the rear surface side of the liquid crystal cell 1210. While, of the exit light, light reflected by the half mirror 1250 passes through the liquid crystal layer of the liquid crystal cell 1210 and the retardation plate 831, the polarized state of the reflected light is changed by the birefringence effects of the liquid crystal layer and the retardation plate 831, and this light is incident on the front polarizing plate 830.

The reflected light incident on the front polarizing plate 830 is nonlinearly polarized light whose polarized state has been changed by the birefringence effects of the retardation plate 831 and the liquid crystal layer of the liquid crystal cell 1210. For this reason, of the nonlinearly polarized light, wavelength light components transmitted through the polarizing plate 830 are transmitted through the front polarizing plate 830 and emerge, and colored light corresponding to the ratio of the wavelength light components of the exit light is obtained.

A display using light from the light source 850 will be described below. The light from the light source 850 is changed into linearly polarized light through the rear polarizing plate 832, and, of the incident light, light transmitted through the half mirror 1250 is incident on the rear surface side of the liquid crystal cell 1210. In the liquid crystal display device, however, the transmission axis 832a of the rear polarizing plate 832 is obliquely shifted with respect to the liquid crystal molecule aligning direction 111a on the second substrate 111 of the liquid crystal cell 1210. For this reason, while the linearly polarized light incident on the rear surface side of the liquid crystal cell 1210 passes through the liquid crystal layer of the liquid crystal cell 1210, the polarized state of the linearly polarized light is changed by the birefringence effect of the liquid crystal layer to obtain elliptically polarized light. While the elliptically polarized light passes through the retardation plate 831, the polarized state of the elliptically polarized light is changed by the birefringence effect of the retardation plate 831, and this light is incident on the front polarizing plate 830.

In this case, the light incident on the front polarizing plate 830 is nonlinearly polarized light whose polarized state has been changed by the birefringence effects of the retardation plate 831 and the liquid crystal layer of the liquid crystal cell 1210. For this reason, of the nonlinearly polarized light, wavelength light components transmitted through the front polarizing plate 830 are transmitted through the front polarizing plate 830 and emerge, and colored light corresponding to the ratio of the wavelength light components of the exit light is obtained.

More specifically, in a reflection display using external light, the liquid crystal display device colors light using the birefringence effects of the retardation plate 831 and the liquid crystal layer of the liquid crystal cell 1210 and the polarizing and analyzing functions of the front polarizing plate 830. In a transmission display using light from the light source 850, the liquid crystal display device colors light using the birefringence effects of the retardation plate 831 and the liquid crystal layer of the liquid crystal cell 1210 and the polarizing function of the rear polarizing plate 832 and the analyzing function of the front polarizing plate 830. According to the livid crystal display device, as in the first to 11th embodiments, colored light considerably brighter than that obtained in a liquid crystal display device using a general color filter can be obtained, and a plurality of desired colors can be displayed by one pixel.

In the liquid crystal display device of the embodiment, the birefringence effect of the retardation plate 831 does not change, but the birefringence effect of the liquid crystal layer of the liquid crystal cell 1210 changes depending on a change in aligned state of the liquid crystal molecules by a voltage applied across the electrodes 813 and 123 of both the substrates 111 and 112. For this reason, when a voltage applied to the liquid crystal cell 1210 is controlled to change the polarized state of light passing through the retardation plate 831 and the liquid crystal layer of the liquid crystal cell 1210, the color of colored light emerging through the front polarizing plate 830 can be changed. Therefore, a plurality of colors can be displayed by one pixel.

The display colors of the liquid crystal display device are as follows. That is, as in the eighth embodiment, in a reflection display using external light, the display color of each pixel is changed into red, blue, green, black, or white in accordance with the voltage applied to the liquid crystal cell. In a transmission display using light from the light source 850, the display color of each pixel is changed into red, green, blue, or white in accordance with the voltage applied to the liquid crystal cell.

A change in color in the reflection display of the liquid crystal display device is shown in FIGS. 22 and 21, and a change in color in the transmission display of the liquid crystal display device is shown in FIGS. 22 and 23.

In the liquid crystal display device of the embodiment, colors of red, blue, green, black, and white can be displayed in the reflection display, and colors of red, green, blue, and white can be displayed in the transmission display. The display colors of the liquid crystal display device are determined depending on voltages applied to the liquid crystal display device, the liquid crystal molecule aligning directions 111a and 112a on the substrates 111 and 112 of the liquid crystal cell, the twist angle of the liquid crystal molecules, the directions of the transmission axes 830a and 832a of the polarizing plates 830 and 832, and the direction of the retardation axis 831a of the retardation plate 831. For this reason, these conditions are properly selected to arbitrarily select a desired display color.

In the first to 12th embodiments, a liquid crystal cell in which liquid crystal molecules are twisted and aligned at a twist angle of almost 90° is used. However, the twist angle of the liquid crystal molecules is not limited to 90°, and the twist angle may fall within the range of 180° to 270°. In addition, the liquid crystal cell may use liquid crystal molecules having an aligned state set to be a homogeneous aligned state, a homeotropic aligned state, or a hybrid aligned state.

In the above embodiments, although the pixel electrodes and the bottom-gate TFTs are arranged on the second substrate, top-gate TFTs may be used. In the liquid crystal cell, pixel electrodes and TFTs may be arranged on the first substrate. In addition, an active matrix cell, a simple matrix cell, or a segment display cell, or the like may be used as the liquid crystal cell.

The liquid crystal display device of each of the above embodiments displays colors of red, green, blue, and white. The display colors of the liquid crystal display device are determined depending on the aligning directions 111a and 112a on the second substrates 111 and 112 of the liquid crystal cell 210, the direction of the transmission axis 130a of the polarizing plate 130, and the direction of the retardation axis 131a of the retardation plate 131. Therefore, these conditions are properly selected to arbitrarily select a desired display color of the liquid crystal display device.

According to the liquid crystal display device of the present invention, one pixel can display the colors of red, green, blue, and white. When different colors are displayed by a plurality of adjacent pixels, a color of a neutral tint obtained by mixing a plurality of colors selected from red, green, blue, and white can be displayed.

When the voltage applied to the liquid crystal display device is controlled to have a voltage value obtained while one color is changed into another color, not only the colors of red, green, blue, and white but also neutral tints can be displayed by one pixel. In this manner, any desired color can be displayed by one pixel, and a high-definition display capable of displaying colors whose number is three times that of the display of a conventional color display device can be obtained. In this case, a multilevel voltage must be stably controlled.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color liquid crystal display device comprising:
   a transparent first substrate having an inner surface and at least one transparent electrode formed thereon;
   an insulating second substrate having an inner surface arranged to oppose the inner surface of said first substrate and at least one electrode formed on the inner surface of said second substrate;
   a liquid crystal layer sandwiched between the inner surfaces of said first and second substrates and having a predetermined initial aligned state;
   a polarizing member arranged on a first substrate side of said liquid crystal layer;
   at least one retardation plate for coloring light which emerges from the liquid crystal display, said retardation plate being arranged between said liquid crystal layer and said polarizing member such that an optical axis of said retardation plate with respect to a transmission axis of said polarizing member is not parallel to or perpendicular to the transmission axis; and
   a reflecting member arranged on a liquid crystal layer side of said second substrate;
   wherein the inner surface of one of said first and second substrates includes a plurality of pixel electrodes and a plurality of active elements respectively corresponding to said plurality of pixel electrodes, said pixel electrodes and said active elements being arranged in a matrix on the inner surface of said one of said first and second substrates, and the inner surface of the other substrate includes at least one counter electrode formed thereon; and
   wherein molecules of said liquid crystal layer are twisted and aligned at an angle of 90°, the transmission axis of said polarizing member is about 45° with respect to an aligning direction of liquid crystal molecules of said liquid crystal layer adjacent to said second substrate, and a phase delay axis of said retardation plate is about 140° with respect to the aligning direction of the liquid crystal molecules of said liquid crystal layer adjacent to said second substrate.

2. An apparatus according to claim 1, wherein said plurality of pixel electrodes and said plurality of active elements respectively corresponding to said plurality of pixel electrodes are formed on the inner surface of said second substrate, and said pixel electrodes also serve as said reflecting member.

3. An apparatus according to claim 1, wherein said plurality of pixel electrodes and said active elements respectively corresponding to said plurality of pixel electrodes are formed on the inner surface of said first substrate, and said at least one counter electrode also serves as said reflecting member.

4. An apparatus according to claim 1, wherein a product $\Delta n \cdot d$ of a refractive index anisotropy $\Delta n$ and a film thickness $d$ of a liquid crystal of said liquid crystal layer is about 1,000 nm, and a retardation value of said retardation plate is about 600 nm.

5. An apparatus according to claim 1, wherein said plurality of active elements arranged on the inner surface of said second substrate are covered with an insulating film having a substantially even surface, and said pixel electrodes are arranged on said insulating film so that at least one part of said pixel electrodes overlap said active elements and are respectively connected to corresponding ones of said active elements.

6. An apparatus according to claim 5, wherein said reflecting member is arranged on said insulating film covering said active elements, and said pixel electrodes are arranged on a liquid crystal layer side of said reflecting member.

7. An apparatus according to claim 5, further comprising a second polarizing member arranged between said reflecting member and said pixel electrodes.

8. An apparatus according to claim 1, further comprising capacitor electrodes arranged on a second substrate side of said pixel electrodes to oppose said pixel electrodes via an insulating film.

9. An apparatus according to claim 1, wherein a light-scattering surface is formed on a front surface of said reflecting member.

10. An apparatus according to claim 1, wherein a light-scattering surface is formed on a front surface of said polarizing member.

11. An apparatus according to claim 10, wherein the light-scattering surface on the front surface of said polarizing member has a haze value which falls within a range of 9 to 14%.

12. An apparatus according to claim 1, wherein a polarizing film is arranged on a front surface side of said reflecting member arranged on said second substrate of said liquid crystal cell, and a transparent electrode is arranged on said polarizing film.

13. An apparatus according to claim 1, wherein at least one light-scattering member is arranged on an optical path through which light incident on said display device emerges.

14. An apparatus according to claim 1, wherein said liquid crystal layer includes liquid crystal molecules which are twisted and aligned homogeneously in said predetermined initial aligned state.

15. A color liquid crystal display device comprising:
    a transparent first substrate having an inner surface and at least one transparent electrode formed thereon;

an insulating second substrate having an inner surface arranged to oppose said first substrate and having at least one electrode formed on the inner surface of said second substrate opposing said at least one transparent electrode formed on the inner surface of said first substrate;

a liquid crystal layer sandwiched between said first and second substrates and having a predetermined initial aligned state;

a first polarizing member arranged on a first substrate side of said liquid crystal layer such that a transmission axis of said polarizing member is shifted at a predetermined angle with respect to a liquid crystal molecule aligning direction on the first substrate side of said liquid crystal layer so as not to be parallel to or perpendicular to the liquid crystal molecule aligning direction;

at least one retardation plate for coloring light which emerges from the liquid crystal display, said retardation plate being arranged between said liquid crystal layer and said polarizing member such that a retardation axis of said retardation plate is shifted by a predetermined angle with respect to a transmission axis of said polarizing member so as not to be parallel to or perpendicular to the transmission axis of said first polarizing member;

a semitransparent reflecting member arranged on a liquid crystal layer side of said second substrate; and a second polarizing member arranged on a second substrate side of said semitransparent reflecting member; and wherein said semitransparent reflecting member includes a mirror surface having a large number of small holes.

16. An apparatus according to claim 15, wherein said at least one transparent electrode formed on the inner surface of said first substrate comprises a plurality of pixel electrodes, a plurality of active elements respectively corresponding to said plurality of pixel electrodes are provided on the inner surface of said first substrate, said pixel electrodes and said active elements being arranged in a matrix, and said at least one electrode formed on the inner surface of said second substrate comprises at least one counter electrode.

17. An apparatus according to claim 16, wherein said plurality of active elements arranged on the inner surface of said second substrate are covered with an insulating film having a substantially even surface, and said pixel electrodes are arranged on said insulating film so that at least one part of said pixel electrodes overlap, said active elements and are respectively connected to corresponding ones of said active elements.

18. An apparatus according to claim 15, wherein said at least one transparent electrode formed on the inner surface of said first substrate comprises a plurality of pixel electrodes, a plurality of active elements respectively corresponding to said plurality of pixel electrodes are provided on the inner surface of said first substrate, said pixel electrodes and said active elements being formed in a matrix, and said at least one electrode formed on the inner surface of said second substrate comprises at least one pixel electrode which also serves as said semitransparent reflecting member.

19. An apparatus according to claim 15, wherein said at least one transparent electrode formed on the inner surface of said first substrate comprises a plurality of pixel electrodes, a plurality of active elements respectively corresponding to said plurality of pixel electrodes are provided on the inner surface of said first substrate, said pixel electrodes and said active elements being formed in a matrix, and said at least one electrode formed on the inner surface of said second substrate comprises at least one counter electrode which also serves as said semitransparent reflecting member.

20. An apparatus according to claim 15, wherein molecules of said liquid crystal layer are twisted and aligned at an angle of about 90°, the transmission axis of said polarizing member is about 170° with respect to an aligning direction of liquid crystal molecules of said liquid crystal layer adjacent to said second substrate, and the retardation axis of said retardation plate is about 150° with respect to the aligning direction of the liquid crystal molecules of said liquid crystal layer adjacent to said second substrate.

21. An apparatus according to claim 20, wherein a product $\Delta n \cdot d$ of a refractive index anisotropy $\Delta n$ and a film thickness d of a liquid crystal of said liquid crystal layer is about 980 nm, and a retardation value of said retardation plate is about 370 nm.

22. A color liquid crystal display device comprising:

a transparent first substrate having an inner surface and at least one transparent electrode formed thereon;

an insulating second substrate having an inner surface arranged to oppose said first substrate and having at least one electrode formed on the inner surface of said second substrate opposing said at least one transparent electrode formed on the inner surface of said first substrate;

a liquid crystal layer sandwiched between said first and second substrates and having a predetermined initial aligned state;

a first polarizing member arranged on a first substrate side of said liquid crystal layer such that a transmission axis of said polarizing member is shifted at a predetermined angle with respect to a liquid crystal molecule aligning direction on the first substrate side of said liquid crystal layer so as not to be parallel to or perpendicular to the liquid crystal molecule aligning direction;

at least one retardation plate for coloring light which emerges from the liquid crystal display, said retardation plate being arranged between said liquid crystal layer and said polarizing member such that a retardation axis of said retardation plate is shifted by a predetermined angle with respect to a transmission axis of said polarizing member so as not to be parallel to or perpendicular to the transmission axis of said first polarizing member;

a semitransparent reflecting member arranged on a liquid crystal layer side of said second substrate; and a second polarizing member arranged on a second substrate side of said semitransparent reflecting member; and wherein molecules of said liquid crystal layer are twisted and aligned at an angle of about 90°, the transmission axis of said polarizing member is about 170° with respect to an aligning direction of liquid crystal molecules of said liquid crystal layer adjacent to said second substrate, and the retardation axis of said retardation plate is about 150° with respect to the aligning direction of the liquid crystal molecules of said liquid crystal layer adjacent to said second substrate.

23. An apparatus according to claim 22, wherein a product $\Delta n \cdot d$ of a refractive index anisotrophy $\Delta n$ and a film thickness d of a liquid crystal of said liquid crystal layer is about 980 nm, and a retardation value of said retardation plate is about 370 nm.

* * * * *